(12) United States Patent
Matsumoto et al.

(10) Patent No.: US 8,757,765 B2
(45) Date of Patent: Jun. 24, 2014

(54) INK COMPOSITION, INK SET AND IMAGE FORMING METHOD USING THE SAME

(75) Inventors: Jun Matsumoto, Kanagawa (JP); Kiyoshi Irita, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 508 days.

(21) Appl. No.: 13/034,717

(22) Filed: Feb. 25, 2011

(65) Prior Publication Data

US 2011/0211013 A1    Sep. 1, 2011

(30) Foreign Application Priority Data

Mar. 1, 2010   (JP) ................................ 2010-044562

(51) Int. Cl.
*C09D 11/00*    (2014.01)

(52) U.S. Cl.
USPC ................................ 347/21; 347/95; 347/100

(58) Field of Classification Search
CPC ......... C09D 11/00; C09D 11/16; C09D 11/38
USPC .................... 347/15, 21, 43, 95–100
See application file for complete search history.

(56) References Cited

U.S. PATENT DOCUMENTS

| | | | |
|---|---|---|---|
| 6,410,611 B1 * | 6/2002 | Sakurai et al. | ........... 522/103 |
| 6,706,777 B1 | 3/2004 | Biro et al. | |
| 2003/0199609 A1 | 10/2003 | Yamanouchi et al. | |
| 2005/0007433 A1 | 1/2005 | Inoue et al. | |
| 2005/0288384 A1 | 12/2005 | Kanke et al. | |
| 2009/0202722 A1 | 8/2009 | Yanagi et al. | |
| 2009/0203833 A1 | 8/2009 | Sasada et al. | |

FOREIGN PATENT DOCUMENTS

| | | |
|---|---|---|
| CN | 101508859 | 8/2009 |
| EP | 0337705 A2 | 10/1989 |
| EP | 1721945 A1 * | 11/2006 |
| JP | 10-287035 A | 10/1998 |
| JP | 2001-115067 A | 4/2001 |
| JP | 2003-201430 | 7/2003 |
| JP | 2009-190232 | 7/2003 |
| JP | 2004-323753 A | 11/2004 |
| JP | 2005-307198 | 11/2005 |
| JP | 2007-314610 A | 12/2007 |
| JP | 2009-191133 | 8/2009 |
| WO | 02/053659 A2 | 7/2002 |

OTHER PUBLICATIONS

Corresponding EPO Official communication.
English language translation of the following: Office action dated Jul. 2, 2013 from the JPO in a Japanese patent application corresponding to the instant patent application. This office action translation is submitted now in order to supplement the understanding of patent document JP2005-307198, JP2009-191133, JP2003-190232 and JP2003-201430 which are cited in the office action and are being disclosed in the instant information Disclosure Statement.
Office action dated Mar. 4, 2014 from the SIPO in a Chinese patent application corresponding to the instant patent application.

* cited by examiner

*Primary Examiner* — Thinh Nguyen
(74) *Attorney, Agent, or Firm* — SOLARIS Intellectual Property Group, PLLC

(57) ABSTRACT

An ink composition includes a colorant particle, a water-soluble polymerizable compound having an acrylamide structure in a molecule thereof, colloidal silica, and water.

12 Claims, 2 Drawing Sheets

INK COMPOSITION, INK SET AND IMAGE FORMING METHOD USING THE SAME

CROSS-REFERENCE TO RELATED APPLICATION

This Application claims priority under 35 USC 119 from Japanese Patent Application No. 2010-044562, filed on Mar. 1, 2010, the disclosure of which is incorporated by reference herein.

BACKGROUND OF THE INVENTION

1. Field of Invention

The present invention relates to an ink composition, an ink set, and an image forming method using the same, which are suitable for recording an image by ejecting an ink according to an ink jet method.

2. Description of the Related Art

Ink jet technology has been applied as an image recording method that records color images in the fields of office printers or home printers, for example. As an ink used for ink jet recording, an aqueous pigment ink containing polymerizable monomers that is cured to improve scratch resistance has been studied. For example, Japanese Patent Application Laid-Open (JP-A) No. 10-287035 discloses an ink jet recording method, and in the ink jet recording method, printing is performed by applying, to a recording medium: an ink composition containing an acrylate monomer, a resin emulsion, and an inorganic oxide colloid; and a reaction liquid containing a photopolymerization initiator and a reactant that produces an aggregate upon contact with the ink composition.

In addition, increasing the degree of crosslinking of formed images, thereby improving the degree of adhesion thereof with respect to a recording medium, has been studied, and, for example, JP-A No. 2007-314610 discloses an active energy ray-curing type aqueous ink that includes a polymerizable monomer having a specific structure. JP-A No. 2001-115067 discloses the use of an ink composition including a specific polymerizable monomer in a technique for improving adhesion with respect to a recording medium (such as plastic) which does not absorb an ink.

Furthermore, JP-A No. 2004-323753 discloses the use of an ink composition including a polymerizable compound having a specific structure, in order to improve the water resistance and heat resistance after curing.

SUMMARY OF THE INVENTION

However, in each of the above techniques, ejection stability (the recovery property after non-use) is extremely insufficient when ejection of an ink composition, particularly, in an ink jet recording apparatus, is stopped and the apparatus is left to stand for a certain period of time, whereafter ejection is resumed.

In addition, in each of the above techniques, suppression of the deterioration of a liquid-repellent film (deterioration of liquid-repellent property) included in an ink jet head member has not been studied and, therefore, there have been demands for further improvement.

Furthermore, improvements in order to satisfy requirements for scratch resistance of images in addition to the above have also been demanded.

According to a first aspect of the invention, there is provided an ink composition including a colorant particle, a water-soluble polymerizable compound having an acrylamide structure in a molecule thereof, colloidal silica, and water.

According to a second aspect of the invention, there is provided an ink set including: the ink composition according to the first aspect of the invention; and a treatment liquid containing an aggregating agent that is capable of aggregating a component in the ink composition.

According to a third aspect of the invention, there is provided an image forming method including ejecting the ink composition according to the first aspect of the invention onto a recording medium from an ink jet head including a silicon nozzle plate to form an image.

DETAILED DESCRIPTION OF THE INVENTION

Figure 1:
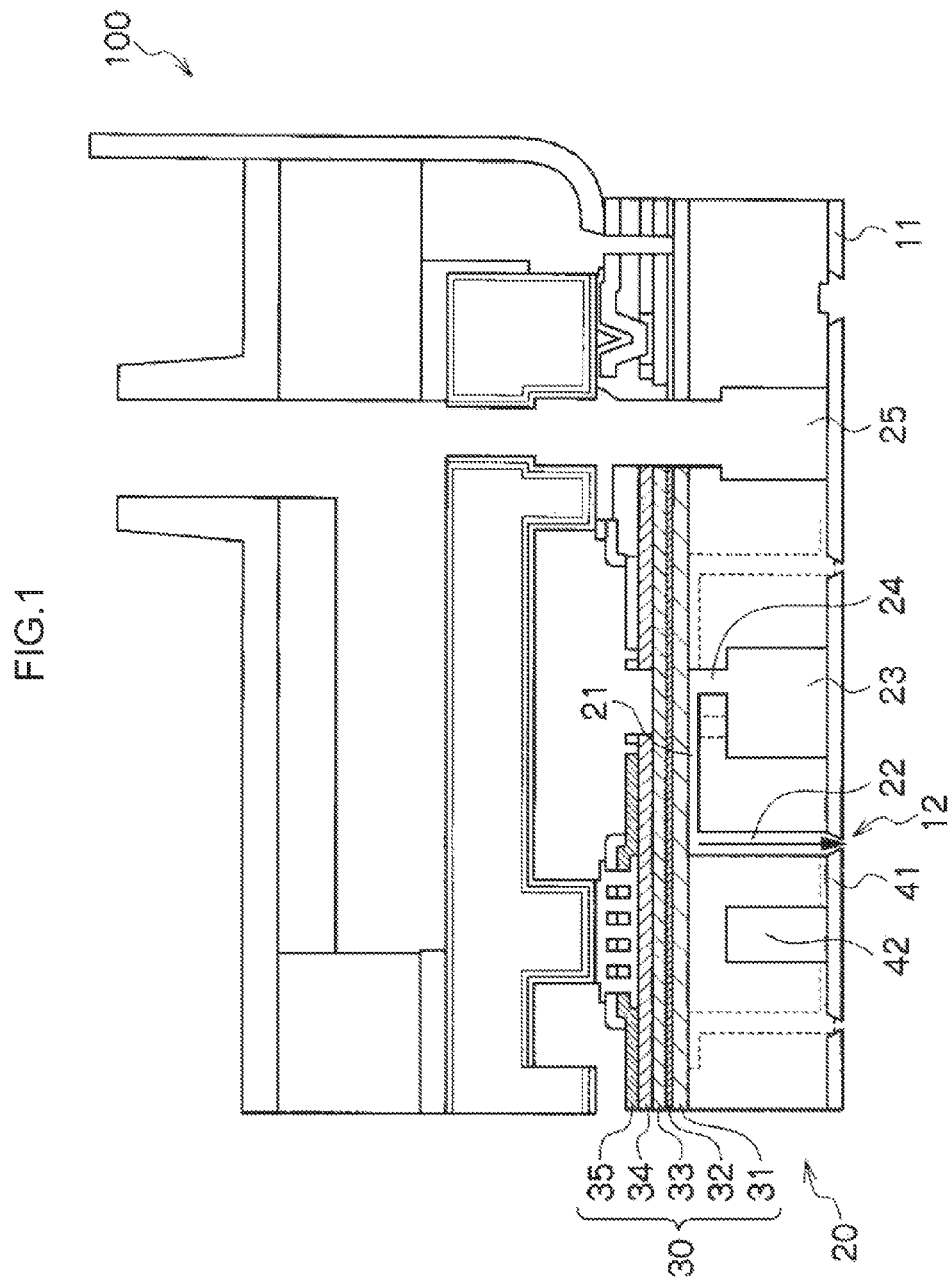
FIG. 1 is a cross-sectional view schematically showing an example of the internal structure of an ink jet head.

Hereinafter, an ink composition, an ink set, and an image-forming method using the same according to the present invention are described in detail.

Ink Composition

The ink composition for an ink jet according to the present invention (hereinafter, simply referred to as "ink composition") is an aqueous ink composition including water as a medium. The ink composition of the present invention includes at least one kind of colorant particles, at least one kind of water-soluble polymerizable compound having an acrylamide structure in molecule thereof, at least one kind of colloidal silica, and water, and may further include one or more additional components if necessary. When the ink composition having such a configuration is used, it is possible to obtain effects in that ejection stability (a recovery property after non-use) is excellent when ejection of an ink composition, in an ink jet recording apparatus, is stopped and the apparatus is left to stand for a certain period of time, whereafter ejection is resumed, the deterioration of the liquid-repellent property of an ink jet head member is suppressed, and the scratch resistance of an image is excellent.

In general, liquid-repellent property is imparted to a member which forms an ink jet head, for example, by treating a surface of the member with a fluorine-based surface treatment agent in order to maintain the ejection performance of an ink. It is known that the liquid-repellent property of an ink jet head member is gradually deteriorated during long-term use of the ink jet head. There are cases in which a nozzle plate including silicon or the like is formed particularly when a fine nozzle (ejection port) is precisely formed. However even in an ink jet head including the silicon nozzle plate, there are cases in which the liquid-repellent property of the nozzle plate is deteriorated by long-term use as a result of which affect the ink ejection property.

According to the ink composition for ink jet of the present invention, the deterioration of the liquid-repellent property of an ink jet head member is further effectively suppressed, also when the ink composition for ink jet of the present invention is used in an ink jet head which includes a nozzle plate formed with, for example, silicon.

The mechanism of the present invention is not clear, but it is thought that since the ink composition according to the present invention includes colloidal silica and a water-soluble polymerizable compound including an acrylamide structure in a molecule thereof, hydrolysis of the ink components is effectively suppressed, and thus the stability of the ink composition is improved. Consequently, an effect in terms of excellent ejection stability (the recovery property after non-use) can be obtained when ejection of the ink composition, in an ink jet recording apparatus, is stopped and the apparatus is left to stand for a certain period of time, whereafter ejection is resumed, and requirements for the scratch resistance of an image are satisfied. Furthermore, it is assumed that when the colloidal silica is appropriately adsorbed on a surface of an ink jet head member, surface corrosion by the ink components is suppressed, as a result of which the deterioration of the liquid-repellent property can be suppressed.

Water-Soluble Polymerizable Compound

The ink composition in the present invention includes at least one kind of water-soluble polymerizable compound having an acrylamide structure in a molecule thereof. The water-soluble polymerizable compound polymerizes when irradiated with active energy rays (for example, radioactive rays, light, or electron rays). Curing by polymerization of the water-soluble polymerizable compound strengthens an image portion.

The expression 'water-soluble' refers to a capability of being dissolved in water at a predetermined concentration or more, and any compound that can be dissolved (preferably, uniformly dissolved) in an aqueous ink may be used. The water-soluble compound may be a compound of which the solubility is increased by the addition of the below-described water-soluble organic solvent such that the compound dissolves (preferably uniformly) in the ink. Specifically, the solubility in water at 25° C. is preferably 10% by mass or more, and more preferably 15% by mass or more.

Here, preferable examples of the water-soluble polymerizable compound having an acrylamide structure in a molecule thereof include a compound represented by the following Formula (1).

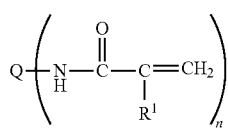

Formula (1)

In Formula (1), Q represents an n-valent linking group, $R^1$ represents a hydrogen atom or a methyl group, and n represents an integer of 1 or more.

The compound of Formula (1) is a compound in which unsaturated vinyl monomers are connected to the linking groups Q through an amide bond. $R^1$ represents a hydrogen atom or a methyl group, and preferably a hydrogen atom. The valency n of the linking group Q is not limited; however, from the viewpoints of improving polymerization efficiency and ejection stability, n is preferably 2 or more, more preferably from 2 to 6, and still more preferably from 2 to 4.

The linking group Q is not particularly limited as long as the linking group Q is a group capable of linking with an acrylamide structure, but it is preferable that the compound represented by Formula (1) be selected from linking groups that satisfy the water-solubility condition described above. Specific examples thereof include residues obtained by removing one or more of hydrogen atoms or hydroxyl groups from a compound selected from Compound group X below.

Compound Group X

Ethylene glycol, diethylene glycol, triethylene glycol, polyethylene glycol, propylene glycol, dipropylene glycol, tripropylene glycol, polypropylene glycol, 1,3-propanediol, 1,2-butanediol, 1,3-butanediol, 1,4-butanediol, 2,3-butanediol, 1,5-pentanediol, 1,4-pentanediol, 2,4-pentanediol, 3-methyl-1,5-pentanediol, 2-methyl-2,4-pentanediol, 1,5-hexanediol, 1,6-hexanediol, 2,5-hexanediol, glycerin, 1,2,4-butanetriol, 1,2,6-hexanetriol, 1,2,5-pentanetriol, thioglycol, trimethylolpropane, ditrimethylolpropane, trimethylolethane, ditrimethylolethane, neopentyl glycol, pentaerythritol, dipentaerythritol and condensates thereof, low-molecular-weight polyvinyl alcohol, polyols such as sugars, and polyamines such as ethylenediamine, diethylenetriamine, triethylenetetramine, polyethyleneimine and polypropylenediamine.

Furthermore, examples thereof include a functional group having a substituted or unsubstituted alkylene chain having 4 or less carbon atoms such as a methylene group, an ethylene group, a propylene group, or a butylene group and a functional group having a saturated or unsaturated heterocycle such as a pyridine ring, an imidazole ring, a pyrazine ring, a piperidine ring, a piperazine ring, or a morpholine ring.

As the linking group Q, among the above, a residue of polyol including an oxyalkylene group (preferably a oxyethylene group) is preferable, and a residue of polyol including three or more oxyalkylene groups (preferably an oxyethylene group) are particularly preferable.

Specific examples of the water-soluble polymerizable compound having an acrylamide structure in a molecule thereof include the following water-soluble polymerizable compounds.

Polymerizable compound 1

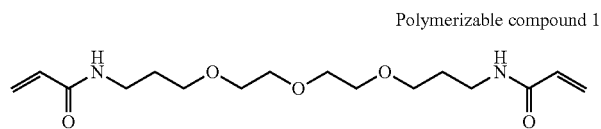

Polymerizable compound 2

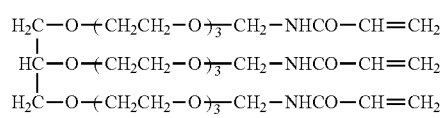

Polymerizable compound 3

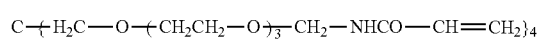

Polymerizable compound 4

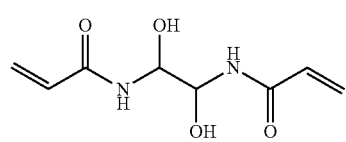

-continued
(a)
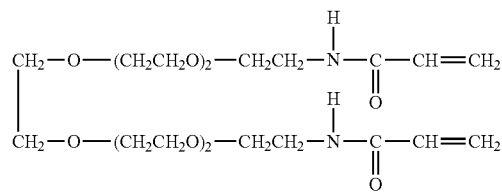
(b)
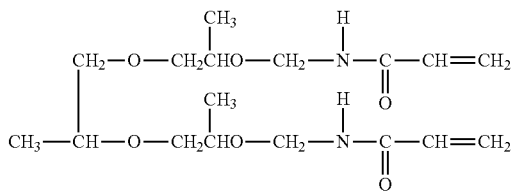
(c)
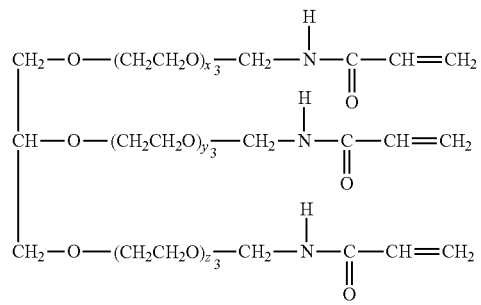
(d)
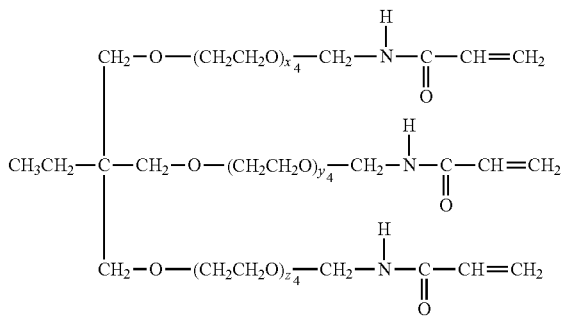
(e)
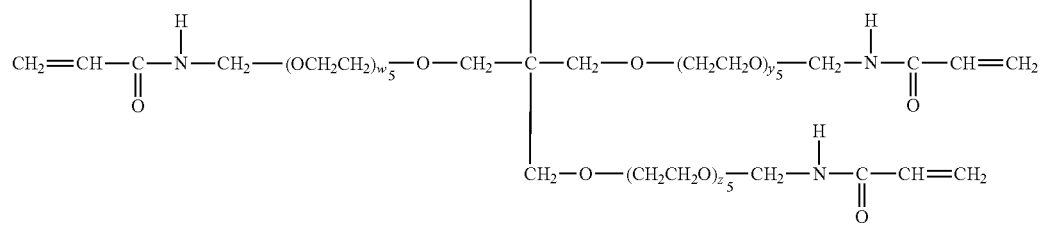
(f)
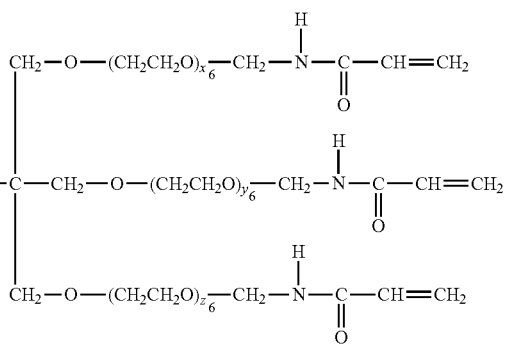
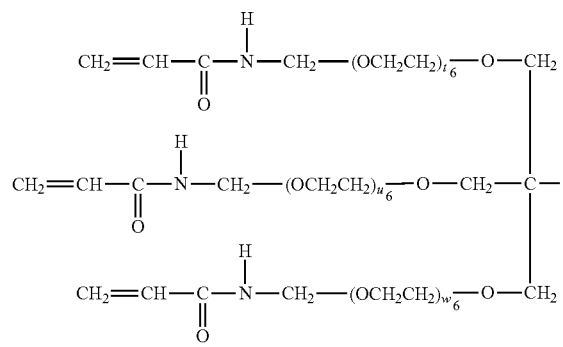
(g)
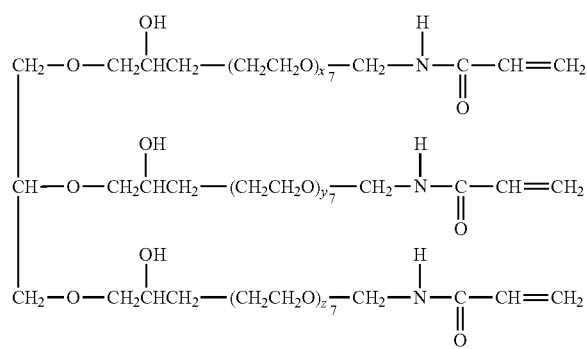

-continued

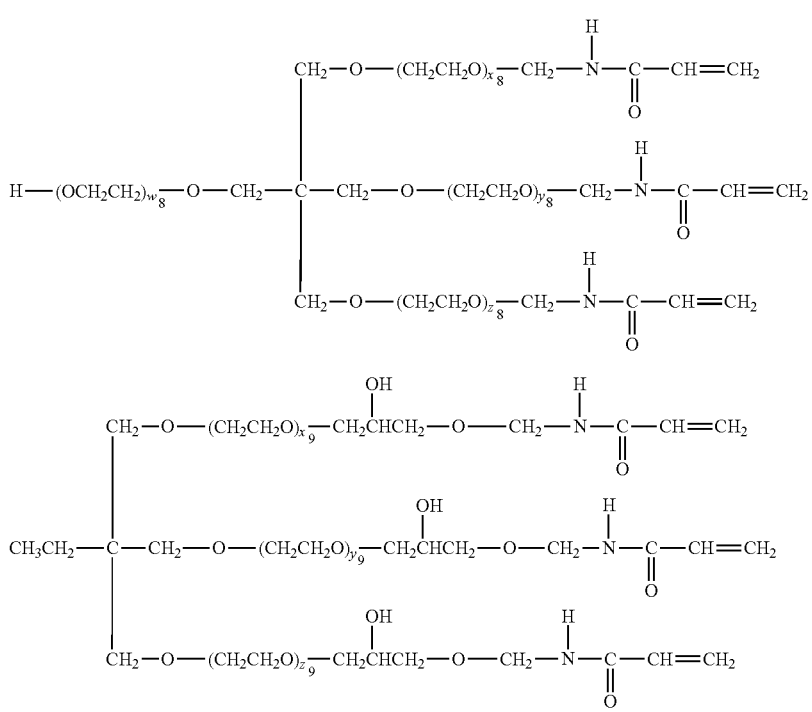

$x_3 + y_3 + z_3 = 6$
$x_4 + y_4 + z_4 = 9$
$w_5 + x_5 + y_5 + z_5 = 6$
$t_6 + u_6 + w_6 + x_6 + y_6 + z_6 = 12$
$x_7 + y_7 + z_7 = 3$
$w_8 + x_8 + y_8 + z_8 = 6$
$x_9 + y_9 + z_9 = 3$

The ink composition may include only one kind of the water-soluble polymerizable compound or two or more kinds of the water-soluble polymerizable compound in combination.

The content of the water-soluble polymerizable compound in the ink composition is preferably from 5% by mass to 30% by mass, and more preferably from 10% by mass to 25% by mass, with respect to the ink composition. When the content of the water-soluble polymerizable compound is 5% by mass or more, image strength is further improved, whereby the scratch resistance of an image is excellent. When the content of the water-soluble polymerizable compound is 30% by mass or less, it is advantageous from the standpoint of pile height.

Colloidal Silica

The colloidal silica refers to a colloid that includes fine particles of an inorganic oxide including silicon with an average particle diameter of several hundred nm or less. The colloidal silica includes silicon dioxide (including hydrates thereof) as the main component, and may include a salt of aluminate as a minor component. Examples of the aluminates that may be included as a minor component include sodium aluminate and potassium aluminate.

The colloidal silicate may include an inorganic salt such as sodium hydroxide, potassium hydroxide, lithium hydroxide, or ammonium hydroxide, or an organic salt such as tetramethylammonium hydroxide. The inorganic salt and organic salt serve, for example, as a stabilizer of the colloid.

The dispersion medium of the colloidal silica is not particularly limited and may be water, an organic solvent, or a mixture thereof. The organic solvent may be either a water-soluble organic solvent or a water-insoluble organic solvent, but a water-soluble organic solvent is more preferable. Specific examples thereof include methanol, ethanol, isopropyl alcohol, and n-propanol.

A manufacturing method of the colloidal silica is not particularly limited and a generally-used method may be employed for the manufacturing the colloidal silica. For example, the colloidal silica can be manufactured by AEROSIL synthesis in which silicon tetrachloride is thermal-decomposed or from liquid glass. The colloidal silica can be manufactured by, for example, a liquid-phase synthesis such as hydrolysis of alkoxide (for example, "SENI TO KOGYO (Fiber and Industry)," Vol. 60, No. 7 (2004), P. 376 can be referenced).

The average particle diameter of the particles in the colloidal silica according to the present invention is not particularly limited, but is preferably from 1 nm to 25 nm, more preferably from 3 nm to 20 nm, still more preferably from 3 nm to 15 nm, and particularly preferably from 5 nm to 10 nm.

When the average particle diameter of 25 nm or less, a damage (for example, deterioration of liquid-repellent property or the like) caused by an ink to members forming an ink jet head such as a substrate, a protecting film, or a liquid-repellent film can further effectively be suppressed. It is thought that, for example, this is because the small average particle diameter increases the total surface area of particles, thereby further effectively suppressing the damage to the members forming the ink jet head. In addition, from the viewpoints of the ejection property of the ink composition and an abrasive effect of the particles, the average particle diameter of the particles in the colloidal silica is preferably 25 nm or less. When the average particle diameter is 1 nm or more, productivity is improved and colloidal silica with little performance variation is obtained.

The average particle diameter of the colloidal silica according to the present invention can be measured by a common measurement method of dispersed particles such as a light scattering method or a laser diffraction method. However, in the present invention, as a more direct method, the particle diameter of 300 colloidal silica particles was measured by a TEM (transmission electron microscopy) imaging method, and the average particle diameter is determined by calculating the average values of the particles.

The shape of the colloidal silica is not particularly limited as long as the ejection performance of an ink is not hindered. For example, the shape of the colloidal silica may be a spherical, long, needle-like, or bead shape; however, among the above, from the viewpoints of the ejection property of an ink, a spherical shape is preferable.

The colloidal silica that can be used for the present invention may be manufactured by the above manufacturing methods or may be a commercially available product. Specific examples of the commercially available product of the colloidal silica include LUDOX AM, LUDOX AS, LUDOX LS, LUDOX TM, and LUDOX HS (trade names, all manufactured by E. I. Du Pont de Nemours and Company); SNOWTEX S, SNOWTEX XS, SNOWTEX 20, SNOWTEX 30, SNOWTEX 40, SNOWTEX N, SNOWTEX C, and SNOWTEX O (trade names, all manufactured by Nissan Chemical Industries Ltd.); SYTON C-30 and SYTON ZOO (trade names, all manufactured by Monsanto Company); NALCOAG-1060, NALCOAG-ID 21 to 64 (trade names, all manufactured by Nalco Chem Company); METHANOL SOL, IPA SOL, MEK SOL, and TOLUENE SOL (trade names, all manufactured by Fuso Chemical Co., Ltd.); CATALOID-S, CATALOID-F120, CATALOID SI-350, CATALOID SI-500, CATALOID SI-30, CATALOID S-20L, CATALOID S-20H, CATALOID S-30L, CATALOID S-30H, CATALOID SI-40, and OSCAL-1432 (isopropyl alcohol sol) (trade names, all manufactured by JGC Catalysts and Chemicals Ltd.); ADELITE (trade name, manufactured by Asahidenka Co., Ltd.); and, as bead-shaped colloidal silica such as SNOWTEX ST-UP, SNOWTEX PS-S, SNOWTEX PS-M, SNOWTEX ST-OUP, SNOWTEX PS-SO, or SNOWTEX PS-MO (trade names, all manufactured by Nissan Chemical Industries Ltd.). All the commercially available products of the colloidal silica can be obtained without difficulty.

The pH of the above commercially available products of colloidal silica dispersion liquid is adjusted to be acidic or alkaline in many cases. This is because the stable dispersion range of colloidal silica is present at an acidic side or alkaline side. Consequently, when a commercially available colloidal silica dispersion liquid is added to an ink composition, it is necessary to take account of the pH of the stable dispersion range of the colloidal silica and the pH of the ink composition.

The content of the colloidal silica in the ink composition according to the present invention is not particularly limited, but is preferably from 0.005% by mass to 0.5% by mass, more preferably from 0.005% by mass to 0.1% by mass, and particularly preferably from 0.01% by mass to 0.1% by mass, with respect to the total amount of the ink composition. When the content of the colloidal silica in the ink composition is in the range of the above upper limit or less, the ejection property of the ink composition is further improved and the influence by the abrasive effect of silica particles on an ink jet head is further effectively suppressed. When the content of the colloidal silica is in the range of the lower limit or more, the deterioration of the liquid-repellent property of an ink jet head member is effectively suppressed.

From the viewpoints of suppression of the deterioration of the liquid-repellent property, of an ink jet head member and improvement of the ink ejection property, the ink composition according to the present invention preferably includes colloidal silica having an average particle diameter (TEM imaging method) of from 3 nm to 25 nm in an amount of from 0.005% by mass to 0.5% by mass with respect to the total amount of the ink composition, and more preferably includes colloidal silica having an average particle diameter of from 3 nm to 15 nm in an amount of from 0.005% by mass to 0.1% by mass with respect to the total amount of the ink composition.

The content ratio of the colloidal silica to the water-soluble polymerizable compound in the ink composition according to the present invention (colloidal silica/water-soluble polymerizable compound) is, on the basis of mass, preferably from 0.0001 to 0.1, and more preferably from 0.001 to 0.05.

When the content ratio of the colloidal silica to the water-soluble polymerizable compound is 0.0001 or more, the deterioration of the liquid-repellent property of an ink jet head member is further effectively suppressed. When the content ratio is 0.1 or less, the ejection property is further improved.

Furthermore, from the viewpoints of the recovery property after non-use and suppression of the deterioration of the liquid-repellent property of an ink jet head member, it is preferable that the ink composition according to the present invention includes the water-soluble polymerizable compound having an acrylamide structure in a molecule thereof and colloidal silica having an average particle diameter (TEM imaging method) of from 3 nm to 25 nm, in which the content ratio (colloidal silica/water-soluble polymerizable compound) is 0.0001 to 0.1 on the basis of mass, and it is more preferable that the ink composition according to the present invention includes the water-soluble polymerizable compound having an acrylamide structure in a molecule thereof and colloidal silica having an average particle diameter of from 3 nm to 15 nm, in which the content ratio (colloidal silica/water-soluble polymerizable compound) is 0.001 to 0.05 on the basis of mass.

Colorant Particle

The ink composition for an ink jet according to the present invention includes at least one kind of colorant particle. The colorant particle may have a function of forming images by coloration, and may be any of a water-insoluble dye, a colored fine particle, and a water-dispersible pigment. In the present invention, a water-dispersible pigment is preferable from the viewpoints of light-fastness.

Specific examples of the water-dispersible pigment include the following pigments (1) to (4).

(1) An encapsulated pigment: a polymer emulsion produced by including a pigment in a polymer particle, and, more specifically, a polymer emulsion produced by coating a pigment with a water-insoluble polymer dispersant and hydrophilizing a polymer layer formed on the surface of the pigment, thereby dispersing the pigment in water.

(2) a self-dispersing pigment: a pigment having at least one kind of hydrophilic group at a surface thereof and exhibiting water-dispersibility in the absence of a dispersant, and, more specifically, a hydrophilidized pigment that is obtained by surface oxidization of, for example, carbon black and that is itself dispersible in water.

(3) a resin-dispersed pigment: a pigment dispersed by a water-soluble polymer compound with a weight-average molecular weight of 50,000 or less.

(4) a surfactant-dispersed pigment: a pigment dispersed using a surfactant.

In the present invention, preferable examples thereof include (1) encapsulated pigment and (2) self-dispersing pigment, and particularly preferable examples thereof include (1) encapsulated pigment. The pigment itself to which the dispersibility is imparted is not limited and can be appropriately selected according to purposes. For example, the pigment may be an organic pigment or an inorganic pigment. The pigment is preferably a pigment that is almost water-insoluble or difficult to dissolve in water, from the standpoint of the ink coloration property.

Examples of the organic pigment include an azo pigment, a polycyclic pigment, a dye chelate, a nitro pigment, a nitroso pigment, and aniline black. Among these, an azo pigment and a polycyclic pigment are preferable. Examples of the inorganic pigment include titanium oxide, iron oxide, calcium carbonate, barium sulfate, aluminum hydroxide, barium yellow, cadmium red, chrome yellow, and carbon black. Among these, carbon black is particularly preferable as a black pigment.

Among the above organic pigments, examples of the organic pigment for orange or yellow include C.I. pigment orange 31, C.I. pigment orange 43, C.I. pigment yellow 12, C.I. pigment yellow 13, C.I. pigment yellow 14, C.I. pigment yellow 15, C.I. pigment yellow 17, C.I. pigment yellow 74, C.I. pigment yellow 93, C.I. pigment yellow 94, C.I. pigment yellow 128, C.I. pigment yellow 138, C.I. pigment yellow 151, C.I. pigment yellow 155, C.I. pigment yellow 180, and C.I. pigment yellow 185. Examples of the organic pigment for magenta or red include C.I. pigment red 2, C.I. pigment red 3, C.I. pigment red 5, C.I. pigment red 6, C.I. pigment red 7, C.I. pigment red 15, C.I. pigment red 16, C.I. pigment red 48:1, C.I. pigment red 53:1, C.I. pigment red 57:1, C.I. pigment red 122, C.I. pigment red 123, C.I. pigment red 139, C.I. pigment red 144, C.I. pigment red 149, C.I. pigment red 166, C.I. pigment red 177, C.I. pigment red 178, C.I. pigment red 222, and C.I. pigment violet 19. Examples of the organic pigment for green or cyan include C.I. pigment blue 15, C.I. pigment blue 15:2, C.I. pigment blue 15:3, C.I. pigment blue 15:4, C.I. pigment blue 16, C.I. pigment blue 60, C.I. pigment green 7, and siloxane-crosslinked aluminum phthalocyanine described in the specification of U.S. Pat. No. 4,311,775. Examples of the organic pigment for black include C.I. pigment black 1, C.I. pigment black 6, and C.I. pigment black 7.

Preferable examples of the azo pigment include a pigment represented by the following Formula (2) and a tautomer thereof. Hereinafter, an azo pigment represented by the following Formula (2) is described.

Formula (2)

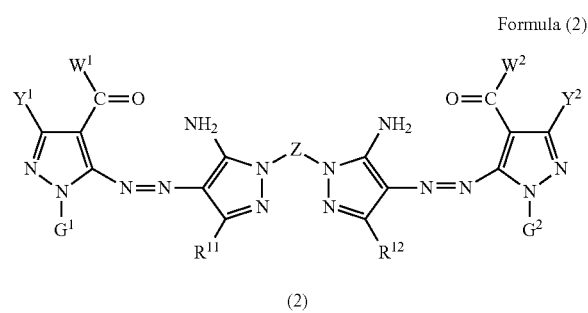

(2)

The azo pigment represented by Formula (2) has a tendency to form an intermolecular interaction due to its specific structure and has a low solubility in water, an organic solvent, or the like.

In contrast to a dye that is used after dissolved in water, an organic solvent, or the like as in a molecular dispersed state, the pigment is used after finely dispersed in a solvent as a solid particle form such as a molecular assembly.

In Formula (2), Z represents a divalent group derived from a nitrogen-containing heterocycle with from 5 to 8 members, $Y^1$, $Y^2$, $R^{11}$, and $R^{12}$ each independently represent a hydrogen atom or a substituent, $G^1$ and $G^2$ each independently represent a hydrogen atom, an alkyl group, a cycloalkyl group, an aralkyl group, an alkenyl group, an alkynyl group, an aryl group or a heterocyclic group, and $W^1$ and $W^2$ each independently represent an alkoxy group, an amino group, an alkyl group or an aryl group.

In Formula (2), Z represents a divalent group derived from a nitrogen-containing heterocycle with from 5 to 8 members. Preferable examples of the nitrogen-containing heterocycle without limitation of a substitution position include a pyrrole ring, a pyrazole ring, a triazole ring, an imidazole ring, a thiazole ring, an isothiazole ring, an oxazole ring, an isoxazole ring, a thiadiazole ring, a thiophene ring, a furan ring, a pyridine ring, a pyrimidine ring, a triazine ring, and a pyridane ring. More preferably, Z is a six-member nitrogen-containing heterocycle such as a pyridine ring, a pyrimidine ring or an s-triazine ring. Particularly preferably, Z is a divalent group derived from a pyrimidine ring.

Z is preferably a six-member nitrogen-containing heterocycle from the standpoint that the intermolecular interaction or the intramolecular interaction of pigment molecules is readily further improved due to hydrogen bonding properties and planarity of the molecules.

Further, the divalent group derived from a nitrogen-containing heterocycle with from 5 to 8 members, which is represented by Z, may form a condensed ring.

When $Y^1$ and $Y^2$ each independently represent a substituent, examples thereof include a halogen atom, an alkyl group ("alkyl group" refers to a straight chain, branched, or ring-shaped, substituted or unsubstituted alkyl group and includes, for example, a cycloalkyl group, a bicycloalkyl group and, furthermore, a tricyclo-structure having more ring structures. An alkyl group described in a substituent below (for example, an alkyl groups such as an alkoxy group, an alkylcarbonyl group or an alkylsulfonyl group) refers to the alkyl group having a concept described above.), an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxy carbonyloxy group, an aryloxy carbonyloxy group, an amino group, an acylamino group, an amino carbonyl amino group, an alkoxy carbonyl amino group, an aryloxy carbonyl amino group, a sulfamoyl amino group, an alkyl sulfonyl amino group, an aryl sulfonyl amino group, a mercapto group, an alkylthio group, an arylthio group, a heterocyclic thio group, a sulfamoyl group, an alkyl sulfinyl group, an aryl sulfinyl group, an alkyl sulfonyl group, an aryl sulfonyl group, an acyl group, an aryloxy carbonyl group, an alkoxy carbonyl group, a carbamoyl group, an aryl azo group, a heterocyclic azo group, an imide group, a phosphino group, a phosphinyl group, a phosphinyloxy group, a phosphinyl amino group, and a silyl group.

Still more preferably, $Y^1$ and $Y^2$ each represent a hydrogen atom, an alkyl group (for example, a methyl group), an aryl group (for example, a phenyl group), a heterocyclic group (for example, a 2-pyridyl group), and an alkylthio group (for example, a methylthio group), and particularly preferably, $Y^1$ and $Y^2$ each represent a hydrogen atom, a methyl group, a phenyl group, and a methylthio group. Among these, a hydrogen atom is most preferable. $Y^1$ may be the same as or different from $Y^2$.

In Formula (2), $R^{11}$ and $R^{12}$ each represent a hydrogen atom or a substituent. When $R^{11}$ and $R^{12}$ each represent a substituent, examples thereof include a straight chain or branched chain alkyl group having from 1 to 12 carbon atoms (such as a methyl group, an ethyl group, an n-propyl group, an i-propyl group, an n-butyl group, an i-butyl group, a sec-butyl group, a t-butyl group, a 2-ethylhexyl group, a 2-methylsulfonyl ethyl group, a 3-phenoxypropyl group, or a trifluoromethyl group), a straight chain or branched chain aralkyl group having from 7 to 18 carbon atoms (such as a benzyl group), a straight chain or branched chain alkenyl group having from 2 to 12 carbon atoms (such as a vinyl group), a straight chain or branched chain alkynyl group having from 2 to 12 carbon atoms (such as an ethinyl group), a straight chain or branched chain cycloalkyl group having from 3 to 12 carbon atoms (such as a cyclopentyl group), a straight chain or branched chain cycloalkenyl group having from 3 to 12 carbon atoms (such as a cyclopentenyl group), a halogen atom (such as chlorine atom, or bromine atom), an aryl group (such as a phenyl group, a 4-t-butyl phenyl group, or a 2,4-di-t-amylphenyl group), a heterocyclic group (such as an imidazolyl group, a pyrazolyl group, a triazolyl group, a 2-furyl group, a 2-thienyl group, a 2-pyrimidinyl group, or a 2-benzothiazolyl group), a cyano group, a hydroxyl group, a nitro group, a carboxy group, an amino group, an alkyloxy group (such as a methoxy group, an ethoxy group, a 2-methoxy ethoxy group, or a 2-methyl sulfonyl ethoxy group), an aryloxy group (such as a phenoxy group, a 2-methyl phenoxy group, a 4-t-butyl phenoxy group, a 3-nitro phenoxy group, a 3-t-butyloxycarbonyl phenoxy group, or a 3-methoxycarbonyl phenyloxy group), an acylamino group (such as an acetamide group, a benzamide group, or a 4-(3-t-butyl-4-hydroxy phenoxy) butanamide group), an alkyl amino group (such as a methyl amino group, a butyl amino group, a diethyl amino group, or a methyl butyl amino group), an aryl amino group (such as a phenyl amino group, or a 2-chloroanilino group), a ureido group (such as a phenyl ureido group, a methyl ureido group, or a N,N-dibutyl ureido group), a sulfamoyl amino group (such as a N,N-dipropylsulfamoyl amino group), an alkylthio group (such as a methylthio group, an octylthio group, or a 2-phenoxy ethylthio group), an arylthio group (such as a phenylthio group, a 2-butoxy-5-t-octyl phenylthio group, or a 2-carboxy phenylthio group), an alkyl oxycarbonyl amino group (such as a methoxy carbonyl amino group), an alkyl sulfonyl amino group and an aryl sulfonyl amino group (such as a methyl sulfonyl amino group, a phenyl sulfonyl amino group, or a p-toluene sulfonyl amino group), a carbamoyl group (such as a N-ethyl carbamoyl group, or a N,N-dibutyl carbamoyl group), a sulfamoyl group (such as a N-ethyl sulfamoyl group, a N,N-dipropylsulfamoyl group, or a N-phenyl sulfamoyl group), a sulfonyl group (such as a methyl sulfonyl group, an octyl sulfonyl group, a phenyl sulfonyl group, or a p-toluene sulfonyl group), an alkyl oxycarbonyl group (such as a methoxy carbonyl group, or a butyl oxycarbonyl group), a heterocyclic oxy group (such as a 1-phenyl tetrazol-5-oxy group, or a 2-tetrahydropyranyl oxy group), an azo group (such as a phenyl azo group, a 4-methoxy phenyl azo group, a 4-pivaloyl amino phenyl azo group, or a 2-hydroxy-4-propanoyl phenyl azo group), an acyl oxygroup (such as an acetoxy group), a carbamoyl oxygroup (such as a N-methyl carbamoyl oxy group, or a N-phenyl carbamoyl oxy group), a silyl oxygroup (such as a trimethyl silyl oxy group, or a dibutyl methyl silyl oxy group), an aryl oxycarbonyl amino group (such as a phenoxy carbonyl amino group), an imide group (such as a N-succinimide group, or a N-phthalimide group), a heterocyclic thio group (such as a 2-benzothiazolylthio group, a 2,4-di-phenoxy-1,3,5-triazol-6-thio group, or a 2-pyridylthio group), a sulfinyl group (such as a 3-phenoxy propylsulfinyl group), a phosphonyl group (such as a phenoxy phosphonyl group, an octyl oxyphosphonyl group, or a phenyl phosphonyl group), an aryl oxycarbonyl group (such as a phenoxy carbonyl group), an acyl group (such as an acetyl group, a 3-phenyl propanoyl group, or a benzoyl group), and an ionic hydrophilic group (such as a carboxyl group, a sulfo group, a phosphono group or a quaternary ammonium group).

In Formula (2), $R^{11}$ and $R^{12}$ each independently represent preferably a substituted or unsubstituted acylamino group with a total carbon number of from 1 to 8, a substituted or unsubstituted alkyl group with a total carbon number of from 1 to 12, a substituted or unsubstituted aryl group with a total carbon number of from 6 to 18, and a substituted or unsubstituted heterocyclic group with a total carbon number of from 4 to 12, and more preferably a straight chain alkyl group or a branched alkyl group with a total carbon number of from 1 to 8, and a methyl group and a t-butyl group are still more preferable. Among these, in particular, a t-butyl group is most preferable.

When $R^{11}$ and $R^{12}$ each independently represent a straight chain alkyl group or a branched alkyl group with a small total carbon number (for example, from 1 to 4), excellent hue, coloration strength, and image robustness can be achieved.

$R^{11}$ may be the same as or different from $R^{12}$.

$G^1$ and $G^2$ each independently represent a hydrogen atom, an alkyl group, a cycloalkyl group, an aralkyl group, an alkenyl group, an alkynyl group, an aryl group, or a heterocyclic group. $G^1$ and $G^2$ each independently represent preferably a hydrogen atom, a methyl group, an ethyl group, an n-propyl group, an i-propyl group, a t-butyl group, a cyclopropyl group, a benzyl group, a 2-phenethyl group, a vinyl group, an allyl group, an ethynyl group, a propargyl group, a phenyl group, a p-tolyl group, a naphthyl group, a pyridyl group, a pyrimidinyl group, and a pyrazinyl group, more preferably a hydrogen atom, a methyl group, a phenyl group, a pyridyl group, a pyrimidinyl group, and a pyrazinyl group. Among these, a methyl group, a 2-pyridyl group, a 2,6-pyrimidinyl group, and a 2,5-pyrazinyl group are preferable.

When $G^1$ and $G^2$ each independently represent an alkyl group, an alkyl group with a total carbon number of 5 or less is preferable, an alkyl group with a total carbon number of 3 or less is more preferable, and a methyl group is most preferable. $G^1$ may be the same as or different from $G^2$.

In Formula (2), $W^1$ and $W^2$ each independently represent an alkoxy group, an amino group, an alkyl group or an aryl group.

As the alkoxy group represented by $W^1$ and $W^2$, a substituted or unsubstituted alkoxy group having from 1 to 30 carbon atoms is preferable, and a substituted or unsubstituted alkoxy group having from 1 to 5 carbon atoms is particularly preferable. Examples thereof include a methoxy group, an ethoxy group, an i-propoxy group, a t-butoxy group, an n-octyloxy group, and a 2-methoxy ethoxy group.

Examples of the amino group represented by $W^1$ and $W^2$ include an alkyl amino group, an arylamino group, and a heterocyclic amino group, and preferable examples thereof include an amino group, a substituted or unsubstituted alkylamino group having from 1 to 30 carbon atoms, and a substituted or unsubstituted anilino group having from 6 to 30 carbon atoms. Among these, an amino group, a substituted or unsubstituted alkylamino group having from 1 to 8 carbon atoms, and a substituted or unsubstituted anilino group having from 6 to 18 carbon atoms are preferable. An amino group, a substituted or unsubstituted alkylamino group having from 1 to 4 carbon atoms, and a substituted or unsubstituted anilino group having from 6 to 12 carbon atoms are more preferable, and examples thereof include an amino group (—$NH_2$), a methyl amino group (—$NHCH_3$), a dimethyl amino group {—$N(CH_3)_2$}, an anilino group (—NHPh), an N-methyl-anilino group {—$N(CH_3)Ph$}, and a diphenyl amino group {—$N(Ph)_2$}.

Examples of the alkyl groups each independently represented by $W^1$ and $W^2$ include a straight chain, branched, or ring-shaped substituted or unsubstituted alkyl group, and also include a cycloalkyl group, a bicycloalkyl group and, furthermore, a tricyclo structure having many ring structures.

Specifically, preferable examples of the alkyl group include an alkyl group having from 1 to 30 carbon atoms such as a methyl group, an ethyl group, an n-propyl group, an i-propyl group, a t-butyl group, an n-octyl group, an eicosyl group, a 2-chloroethyl group, a 2-cyanoethyl group, or a 2-ethylhexyl group. Preferable examples of the cycloalkyl group include a substituted or unsubstituted cycloalkyl group having from 3 to 30 carbon atoms such as a cyclohexyl group, a cyclopentyl group, or a 4-n-dodecylcyclohexyl group. Preferable examples of the bicycloalkyl group include a substituted or unsubstituted bicycloalkyl group having from 5 to 30 carbon atoms, which is, a univalent group formed by removing one hydrogen atom from a bicycloalkane having from 5 to 30 carbon atoms such as a bicyclo[1.2.2]heptane-2-yl group or a bicyclo[2.2.2]octane-3-yl group.

Preferable examples of the aryl group represented by $W^1$ and $W^2$ include a substituted or unsubstituted aryl group having from 6 to 30 carbon atoms. Among these, a substituted or unsubstituted aryl group having from 6 to 18 carbon atoms is preferable. A substituted or unsubstituted aryl group having from 6 to 12 carbon atoms are more preferable, and examples thereof include a phenyl group, a p-tolyl group, a naphthyl group, an m-chlorophenyl group, and an o-hexadecanoylaminophenyl group.

Among the above, preferable examples of $W^1$ and $W^2$ include an alkoxy group (such as a methoxy group, an ethoxy group, an i-propoxy group, or a t-butoxy group), an amino group (such as a —$NH_2$ group, a methylamino group, a dimethylamino group, or an anilino group), an alkyl group (such as a methyl group, an ethyl group, an n-propyl group, an i-propyl group, a t-butyl group, or a cyclopropyl group) and an aryl group (such as a phenyl group, a p-tolyl group, or a naphthyl group). Among these, an alkoxy group, an amino group, a phenyl group and an alkyl group are preferable, and an alkoxy group and an amino group are more preferable.

Further more preferable examples thereof include an alkoxy group with a total carbon number of 5 or less, an amino group (—$NH_2$ group), and an alkylamino group with a total carbon number of 5 or less. It is preferable that $W^1$ and $W^2$ each independently represent preferably an alkoxy group with a total carbon number of 5 or less, an amino group, or an alkylamino group with a total carbon number of 5 or less since a pigment molecule has a tendency to form a strong hydrogen bond at least either in a molecule thereof or between molecules, from the standpoint of excellent hue and a high robustness (such as light-fastness, gas resistance, water resistance, and chemical resistance).

From the standpoint of hue, light-fastness, and solvent resistance, particularly preferable examples thereof include an alkoxy group with a total carbon number of 3 or less, an amino group (—$NH_2$ group) and an alkylamino group with a total carbon number of 3 or less. Among these, in particular, a methoxy group (—$OCH_3$ group) and an ethoxy group (—$OC_2H_5$ group) are preferable, and a methoxy group is particularly preferable from the standpoint of excellent hue and light-fastness improvement.

$W^1$ may be the same as or different from $W^2$.

In the present invention, when Z, $Y^1$, $Y^2$, $R^{11}$, $R^{12}$, $G^1$, $G^2$, $W^1$ and $W^2$ each independently further include a substituent, examples of the substituent include the following substituent.

Example thereof include a halogen atom, an alkyl group, an aralkyl group, an alkenyl group, an alkynyl group, an aryl group, a heterocyclic group, a cyano group, a hydroxy group, a nitro group, an alkoxy group, an aryloxy group, a silyloxy group, a heterocyclic oxy group, an acyloxy group, a carbamoyloxy group, an alkoxy carbonyloxy group, an aryloxy carbonyloxy group, an amino group, an acyl amino group, an amino carbonyl amino group, an alkoxy carbonyl amino group, an aryl oxycarbonyl amino group, a sulfamoyl amino group, an alkyl sulfonyl amino group, an aryl sulfonyl amino group, a mercapto group, an alkylthio group, an arylthio group, a heterocyclic thio group, a sulfamoyl group, an alkyl sulfinyl group, an aryl sulfinyl group, an alkyl sulfonyl group, an aryl sulfonyl group, an acyl group, an aryl oxycarbonyl group, an alkoxy carbonyl group, a carbamoyl group, an aryl ring azo group, a heterocyclic azo group, an imide group, a phosphino group, a phosphinyl group, a phosphinyloxy group, a phosphinyl amino group, and a silyl group.

Dispersant

A dispersant used for the colorant particle may be a polymer dispersant or a low-molecular-weight surfactant-type dispersant. The polymer dispersant may be a water-soluble dispersant or a water-insoluble dispersant.

The low-molecular-weight surfactant-type dispersant can maintain a low viscosity level of an ink and stably disperse a pigment in an aqueous solvent. The low-molecular-weight surfactant-type dispersant refers to a low-molecular-weight dispersant having a molecular weight of 2,000 or less. The molecular weight of the low-molecular-weight surfactant-type dispersant is preferably from 100 to 2,000, and more preferably from 200 to 2,000.

The low-molecular-weight surfactant-type dispersant has a structure including a hydrophilic group and a hydrophobic group. Each of at least one hydrophilic group and at least one hydrophobic group may be contained in one molecule independently. The low-molecular-weight surfactant-type dispersant may include plural kinds of hydrophilic groups and hydrophobic groups, respectively, and may optionally contain a linking group for connecting a hydrophilic group and a hydrophobic group.

The hydrophilic group may be an anionic group, a cationic group, a nonionic group, and a betine-type which is a combination thereof. The anionic group is not particularly restricted as long as the anionic group has a negative charge. However, the anionic group is preferably a phosphoric acid group, a phosphonic acid group, a phosphinic acid group, a sulfuric acid group, a sulfonic acid group, a sulfinic acid group, or a carboxylic acid group, more preferably a phosphoric acid group or a carboxylic acid group, and still more preferably a carboxylic acid group. The cationic group is not particularly restricted as long as the cationic group has a positive charge. However, the cationic group is preferably an organic cationic substituent, is more preferably a cationic group containing a nitrogen atom or phosphorous atom, and still more preferably a pyridinium cation or an ammonium cation. Examples of the nonionic group include polyethylene oxide, polyglycerin, and a sugar unit of a certain kind.

The hydrophilic group is preferably an anionic group. The anionic group is preferably a phosphoric acid group, a phosphonic acid group, a phosphinic acid group, a sulfuric acid group, a sulfonic acid group, a sulfinic acid group, or a carboxylic acid group, more preferably a phosphoric acid group or a carboxylic acid group, and still more preferably a carboxylic acid group.

When the low-molecular-weight surfactant-type dispersant has an anionic hydrophilic group, from the viewpoints of accelerating an aggregation reaction bringing the low-molecular-weight surfactant-type dispersant into contact with an acidic treatment liquid, the pKa thereof is preferably 3 or more. The pKa of a low-molecular-weight surfactant-type dispersant refers to a value experimentally obtained from a titration curve obtained in such a manner that a liquid in which a low-molecular-weight surfactant-type dispersant is dissolved in a solution of tetrahydrofuran and water (3:2=V/V) at a concentration of 1 mmol/L is titrated with an acidic or alkaline solution. When the pKa of a low-molecular-weight surfactant-type dispersant is 3 or more, theoretically, 50% or more of anionic groups is in an undissociated state when the low-molecular-weight surfactant-type dispersant is brought into contact with a liquid with a pH of about 3. Therefore, the water solubility of the low-molecular-weight surfactant-type dispersant remarkably decreases and aggregation reaction takes place. That is, aggregation reactivity is improved. From this point of view, it is preferable that the low-molecular-weight surfactant-type dispersant has a carboxylic acid groups as an anionic group.

The hydrophobic group may have any structures containing a hydrocarbon, a fluorocarbon, a silicone, or the like, it is particularly preferable that the hydrophobic group has a structure containing a hydrocarbon. The hydrophobic group may either have a straight-chained structure or a branched structure. The hydrophobic group may have a structure with a single chain or a structure with two or more chains, and when the hydrophobic group has a structure with two or more chains, the hydrophobic group may contain plural kinds of hydrophobic groups.

The hydrophobic group has preferably a hydrocarbon group having from 2 to 24 carbon atoms, more preferably a hydrocarbon group having from 4 to 24 carbon atoms, and still more preferably a hydrocarbon group having from 6 to 20 carbon atoms.

Among the polymer dispersant, as the water-soluble dispersant of the polymer dispersant, a hydrophilic polymer compound may be used. Examples of the natural hydrophilic polymer compound include plant-derived polymers such as gum arabic, gum tragan, guar gum, karaya gum, locust bean gum, arabinogalacton, pectin, or queens seed starch; sea weed-derived polymers such as alginic acid, carrageenan, or agar; animal-derived polymers such as gelatin, casein, albumen, or collagen; and microorganism-derived polymers such as xanthan gum or dextran.

Examples of the hydrophilic polymer compound formed by chemically modifying a natural product as a raw material include cellulose polymers such as methyl cellulose, ethyl cellulose, hydroxyethyl cellulose, hydroxypropyl cellulose, or carboxymethyl cellulose; starch polymers such as sodium starch glycolate or sodium starch phosphate ester; and sea weed polymers such as sodium alginate or propylene glycol ester alginate.

Examples of synthetic hydrophilic polymer compounds include vinyl polymers such as polyvinyl alcohol, polyvinyl pyrrolidone, or polyvinyl methyl ether; acrylic resins such as non-crosslinked polyacrylamide, polyacrylic acid or an alkali metal salt thereof or water-soluble styrene acrylic resin; water-soluble styrene maleic acid resins; water-soluble vinyl naphthalene acrylic resins; water-soluble vinyl naphthalene maleic acid resins; polyvinylpyrrolidone; polyvinylalcohol; an alkali metal salt of β-naphthalenesulfonic acid-formalin condensate; polymer compounds having a salt of cationic functional group such as a quaternary ammonium or an amino group at the side chain; and natural polymer compounds such as shellac.

Among these, the hydrophilic polymer compound is preferably a water-soluble dispersant in which a carboxyl group is introduced therein. Examples thereof include a homopolymer of such as an acrylic acid, a methacrylic acid, or a styrene-acrylic acid; and a copolymer of monomers including other hydrophilic groups.

Among these polymer dispersants, as the water-insoluble dispersant, a polymer having both a hydrophobic moiety and a hydrophilic moiety may be used. Examples thereof include a styrene-(meth)acrylic acid copolymer, a styrene-(meth)acrylic acid-(meth)acrylic acid ester copolymer, a (meth)acrylic acid ester-(meth)acrylic acid copolymer, a polyethylene glycol(meth)acrylate-(meth)acrylic acid copolymer, a vinyl acetate-maleic acid copolymer, and styrene-maleic acid copolymer.

The weight-average molecular weight of the polymer dispersant is preferably from 3,000 to 100,000, more preferably from 5,000 to 50,000, still more preferably from 5,000 to 40,000, and particularly preferably from 10,000 to 40,000.

From the viewpoints of self-dispersibility and aggregation speed when the below-described treatment liquid is brought into contact, the polymer dispersant preferably includes a polymer having a carboxyl group, more preferably a polymer having a carboxyl group with an acid value of 100 mgKOH/g or less, and still more preferably a polymer with an acid value of from 25 mgKOH/g to 100 mgKOH/g. Particularly, when the ink composition according to the present invention is used in combination with a treatment liquid (the details thereof are described below.) that aggregates components in the ink composition, a polymer dispersant having a carboxyl group with an acid value of from 25 mgKOH/g to 100 mgKOH/g is useful.

The mass mixing ratio (p:s) of a pigment (p) and a dispersant (s) is preferably in a range of from 1:0.06 to 1:3, more preferably in a range of from 1:0.125 to 1:2, and still more preferably from 1:0.125 to 1:1.5.

In the present invention, from the viewpoints of the light-fastness or quality of images, the colorant particle includes preferably a pigment and a dispersant, more preferably an organic pigment and a polymer dispersant, and particularly preferably an organic pigment and a polymer dispersant having a carboxyl group. In addition, from the viewpoints of aggregation property, the pigment is preferably coated with a water-insoluble polymer dispersant having a carboxyl group. The water-insoluble polymer refers to a polymer having an amount of dissolution of 10 g or less when the polymer is dissolved in 100 g of water at 25° C. after dried at 105° C. for 2 hours. The water-insoluble polymer preferably has an amount of dissolution of 5 g or less and more preferably an amount of dissolution of 1 g or less. The amount of dissolution refers to an amount of dissolution when a polymer is neutralized to a degree of 100% by either a sodium hydroxide or an acetic acid depending on a kind of the salt-generating group of the water-insoluble polymer.

The average particle diameter of the pigment in a dispersed state is preferably from 10 nm to 200 nm, more preferably from 10 nm to 150 nm, and still more preferably from 10 nm to 100 nm. When the average particle diameter is 200 nm or less, color-reproducibility is excellent and a droplet ejection property when ejecting droplets by an ink jet method is excellent. When the average particle diameter is 10 nm or more, light-fastness is excellent. The particle size distribution of the colorant is not particularly limited, and may be either a wide particle size distribution or a mono-dispersed particle size distribution. Two or more kinds of colorants having a mono-dispersed particle size distribution may be mixed and used.

Here, the average particle diameter of the pigment in a dispersed state refers to an average particle diameter of the pigment as a component in an ink, but the same applies to a condensed ink dispersion which is a state before the pigment is used for an ink.

Meanwhile, the average particle diameter of the pigment in a dispersed state and the average particle diameter and particle size distribution of the polymer particle are obtained by measuring the volume average particle diameter by a dynamic light scattering method using a NANOTRACK particle size distribution measuring apparatus UPA-EX 150 (trade name, manufactured by Nikkiso Co., Ltd.)

With respect to the pigment, one kind of the pigment may be used alone or two or more kinds of the pigments may be used in combination.

From the viewpoints of image density, the content of the pigment in the ink composition is preferably from 1% by mass to 25% by mass, more preferably from 2% by mass to 20% by mass, still more preferably from 2% by mass to 15% by mass, and particularly preferably from 3% by mass to 10% by mass, with respect to the ink composition.

Water-Soluble Organic Solvent

The ink composition in the present invention may include at least one kind of water-soluble organic solvent. The water-soluble organic solvent can produce effects of prevention of drying, moistening, or penetration acceleration. For prevention of drying, the water-soluble organic solvent can be used as an anti-drying agent that prevents clogging caused by an aggregate formed by an ink sticked and dried on an ink ejection port of a jetting nozzle. A water-soluble organic solvent having a vapor pressure lower than that of water is preferable for moistening and prevention of drying. For penetration acceleration, the water-soluble organic solvent can be used as a penetration accelerating agent that increases an ink-penetrating property into a paper.

The anti-drying agent is preferably a water-soluble organic solvent having a vapor pressure lower than that of water. Specific examples thereof include polyhydric alcohols represented by, for example, ethylene glycol, propylene glycol, diethylene glycol, polyethylene glycol, thiodiglycol, dithio-diglycol, 2-methyl-1,3-propandiol, 1,2,6-hexanetriol, acetylene glycol derivatives, glycerin, and trimethylolpropane; lower alkyl ethers of polyhydric alcohols such as ethylene glycol monomethyl (or ethyl)ether, diethylene glycol monomethyl (or ethyl)ether, and triethylene glycol monoethyl (or butyl)ether; heterocycles such as 2-pyrrolidone, N-methyl-2-pyrrolidone, 1,3-dimethyl-2-imidazolidinone, and N-ethylmorpholine; sulfur-containing compounds such as sulfolane, dimethyl sulfoxide, and 3-sulfolene; polyfunctional compounds such as diacetone alcohol and diethanolamine; and urea derivatives.

Among these, polyhydric alcohols such as glycerin and diethylene glycol are preferable as an anti-drying agent.

With respect to the anti-drying agent, one kind of the anti-drying agent may be used alone, or two or more kinds of the anti-drying agents may be used in combination. The content of the anti-drying agent in the ink composition is preferably in a range of from 10% by mass to 50% by mass with respect to the ink composition.

As a penetration accelerating agent, a water-soluble organic solvent is preferable for the purpose of better penetration of the ink composition into a recording medium (a printing paper or the like). Specific preferable examples of such a water-soluble organic solvent include alcohols such as ethanol, isopropanol, butanol, di(tri)ethylene glycol monobutyl ether, and 1,2-hexanediol, sodium lauryl sulfate, sodium oleate, and a nonionic surfactant.

With respect to the penetration accelerating agent, one kind of the penetration accelerating agent may be used alone, or two or more kinds of the penetration accelerating agents may be used in combination. The content of the penetration accelerating agent in the ink composition is preferably in a range of from 5% by mass to 30% by mass with respect to the ink composition. In addition, the amount of the penetration accelerating agent to be used is preferably within a range in which the penetration accelerating agent does not cause bleeding of a image or a print through.

In addition to the above purposes, the water-soluble organic solvents may be used to adjust the viscosity. Specific examples of the water-soluble organic solvent that may be used for adjusting the viscosity include alcohols (for example, methanol, ethanol, propanol, isopropanol, butanol, isobutanol, sec-butanol, t-butanol, pentanol, hexanol, cyclohexanol, and benzyl alcohol); polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol); glycol derivatives (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether); amines (for example, ethanolamine, diethanolamine, triethanolamine, N-methyl diethanolamine, N-ethyl diethanolamine, morpholine, N-ethyl morpholine, ethylenediamine, diethylenetriamine, triethylenetetramine, polyethylene imine, and tetramethyl propylenediamine); and other polar solvents (for example, formamide, N,N-dimethylformamide, N,N-dimethyl acetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone). In this case, one kind of the water-soluble organic solvent may be used alone, or two or more kinds of the water-soluble organic solvents may be used in combination.

Polymer Particles

The ink composition in the present invention may contain polymer particles. The polymer particles are preferably self-dispersing polymer particles. Hereinafter, as the preferable polymer particles, self-dispersing polymer particles are described in detail as an example.

Self-Dispersing Polymer Particles

The ink composition in the present invention preferably contains at least one kind of self-dispersing polymer particles as the polymer particles. The self-dispersing polymer particles have a function to fix the ink composition when contacting with the below-mentioned treatment liquid or an area on which the treatment liquid has been applied and dried. When contacting with the treatment liquid or area, the dispersion state of the self-dispersing polymer particles becomes unstable and the self-dispersing polymer particles aggregate, whereby the viscosity of the ink is increased and the fixation of the ink composition is achieved. Thus, the self-dispersing polymer particles further improve the fixability of the ink composition on a recording medium and the scratch resistance of an image. From the viewpoints of ejection stability and the liquid stability of a system including the above pigment (particularly, dispersion stability) as well, the self-dispersing polymer is thought to be preferable resin particles.

The self-dispersing polymer particles refer to particles of a water-insoluble polymer that does not contain a free emulsifier and that can get into a dispersed state in an aqueous medium (particularly, a dispersed state by a phase inversion emulsification method) even in the absence of a surfactant due to a functional group (particularly, an acidic groups or a salt thereof) which the polymer itself has.

Here, the dispersed state includes both an emulsified state (emulsion) in which a water-insoluble, polymer in the liquid state is dispersed in an aqueous medium and a dispersed state (suspension) in which a water-insoluble polymer in the solid state is dispersed in an aqueous medium.

As the water-insoluble polymer in the present invention, from the viewpoints of aggregation speed and fixability when the water-insoluble polymer is contained in a liquid composition, the water-insoluble polymer is preferably a water-insoluble polymer that can get into a dispersed state in which the water-insoluble polymer is dispersed in a solid state.

Examples of the preparation method of an emulsified or dispersed state of the self-dispersing polymer particles, that is, of the preparation method of the aqueous dispersion of the self-dispersing polymer particles include a phase inversion emulsification method. For example, the phase inversion emulsification method may be a method in which a self-dispersing polymer is dissolved or dispersed in a solvent (for example, a hydrophilic organic solvent or the like), the resultant solution is introduced into water without addition of a surfactant, subsequently, the solution is stirred and mixed while being in a state in which a salt-generating group (for example, an acidic group) included in the self-dispersing polymer are neutralized, and the solvent is removed, thereby obtaining an aqueous dispersion in an emulsified or dispersed state.

The following procedure can be used to determine whether a water-insoluble polymer is a self-dispersing polymer as mentioned herein: 30 g of a water-insoluble polymer is dissolved in 70 g of an organic solvent (such as methyl ethyl ketone) to form a solution, the solution is mixed with 200 g of water and a neutralizing agent that can neutralize the salt-forming groups of the water-insoluble polymer to a degree of 100% (the neutralizing agent being sodium hydroxide if the salt-forming groups are anionic, or acetic acid if the salt-forming groups are cationic), the mixture is stirred with a stirrer having a stirring blade at a rotation rate of 200 rpm at 25° C. for 30 minutes, and the organic solvent is removed from the mixture liquid. If a stable dispersion state of the water-insoluble polymer in the mixture liquid is confirmed by visual observation for at least one week at 25° C. after the removal of the organic solvent, the water-insoluble polymer is considered to be a self-dispersing polymer.

Here, the term 'water-insoluble' is the same as the one described in the section of the dispersant above.

The aqueous medium includes water, and may include a hydrophilic organic solvent, optionally. In the present invention, the aqueous medium is preferably formed by water and a hydrophilic organic solvent whose amount is 0.2% by mass or less with respect to the water, and is more preferably formed by water only.

The main chain skeleton of the water-insoluble polymer is not particularly limited. Examples thereof include a vinyl polymer and a condensed polymer (such as an epoxy resin, polyester, polyurethane, polyamide, cellulose, polyether, polyurea, polyimide, or polycarbonate). Among them, a vinyl polymer is particularly preferred.

Preferable examples of the vinyl polymer and a monomer for forming the vinyl polymer include those described in JP-A No. 2001-181549 and JP-A No. 2002-88294. It is also possible to use a vinyl polymer that has a dissociable group introduced to a terminal of the polymer chain by the radical polymerization of a vinyl monomer using a chain transfer agent, a polymerization initiator, or iniferter that has the dissociable group (or a substituent that can be converted to the dissociable group) or by ion polymerization using a compound having the dissociable group (or a substituent that can be converted to the dissociable group) as either an initiator or a terminator.

Preferable examples of the condensed polymer and the monomer or monomers for forming the condensed polymer include those described in JP-A No. 2001-247787.

From the viewpoints of self-dispersibility, the self-dispersing polymer particles preferably includes a water-insoluble polymer having a hydrophilic structural unit and a structural unit derived from an aromatic group-containing monomer.

The hydrophilic structural unit is not particularly limited as long as the hydrophilic structural unit is derived from a hydrophilic group-containing monomer, and may be derived from a monomer containing one kind of hydrophilic group or a monomer containing two or more kinds of hydrophilic groups. The hydrophilic group is not particularly limited. The hydrophilic group may be a dissociable group or a nonionic hydrophilic group.

From the viewpoints of acceleration of self-dispersion and providing stability of a formed emulsified or dispersed state, the hydrophilic group in the present invention is preferably a dissociable group, and more preferably an anionic dissociable group. Examples of the dissociable group include a carboxyl group, a phosphoric acid group, and a sulfonic acid group. Among these, the dissociable group is preferably a carboxyl group from the viewpoints of fixability of an ink composition containing the self-dispersing polymer.

From the viewpoints of self-dispersibility and aggregation property, the hydrophilic group-containing monomer in the present invention is preferably a dissociable group-containing monomer, and more preferably a dissociable group-containing monomer having a dissociable group and an ethylenic unsaturated bond.

Examples of the dissociable group-containing monomer include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid and 2-methacryloyloxymethyl succinic acid.

Specific examples of the unsaturated sulfonic acid monomer include styrenesulfonic acid, 2-acrylamide-2-methylpropane sulfonic acid, 3-sulfopropyl(meth)acrylate, and bis-(3-sulfopropyl)-itaconic acid ester.

Specific examples of the unsaturated phosphoric acid monomer include vinylphosphonic acid, vinyl phosphate, bis(methacryloyloxyethyl)phosphate, diphenyl-2-acryloyloxyethyl phosphate, diphenyl-2-methacryloyloxyethyl phosphate, and dibutyl-2-acryloyloxyethyl phosphate.

Among the dissociable group-containing monomers, unsaturated carboxylic acid monomers are preferable, acrylic monomers and methacrylic monomers are more preferable, and acrylic acid and methacrylic acid are particularly preferable, from the viewpoints of dispersion stability and ejection stability.

When the self-dispersing polymer in the present invention includes an anionic dissociable group, the acid value of the self-dispersing polymer is preferably 200 mgKOH/g or less, more preferably from 25 mgKOH/g to 120 mgKOH/g, and still more preferably from 30 mgKOH/g to 80 mgKOH/g, from the viewpoints of an excellent aggregation property when contacting with a treatment liquid. When the acid value of the self-dispersing polymer is 25 or more, the stability of the self-dispersibility is excellent.

The aromatic group-containing monomer is not particularly limited as long as the aromatic group-containing monomer is a compound including an aromatic group and a polymerizable group. The aromatic group may be a group derived from an aromatic hydrocarbon or a group derived from an aromatic heterocycle. In the present invention, from the viewpoints of stability of the particle shape in an aqueous medium, an aromatic group derived from an aromatic hydrocarbon is preferred.

The polymerizable group may be a condensation polymerizable group or an addition polymerization group. In the present invention, from the viewpoints of stability of the particle shape in an aqueous medium, an addition polymerizable group is preferable, and a group including an ethylenic unsaturated bond is more preferable.

The aromatic group-containing monomer in the present invention is preferably a monomer including an aromatic group derived from an aromatic hydrocarbon and an ethylenic unsaturated bond. With respect to the aromatic group-containing monomer, one kind of the aromatic group-containing monomer may be used alone, or two or more kinds of the aromatic group-containing monomers may be used in combination.

Examples of the aromatic group-containing monomer include phenoxyethyl(meth)acrylate, benzyl(meth)acrylate, phenyl(meth)acrylate, and styrene-based monomer. Among them, an aromatic group-containing (meth)acrylate monomer is preferable, at least one kind selected from phenoxyethyl (meth)acrylate, benzyl(meth)acrylate, or phenyl(meth)acrylate is more preferable, and phenoxyethyl(meth)acrylate and benzyl(meth)acrylate are still more preferable, from the viewpoints of ink fixability and the balance between hydrophilicity and hydrophobicity of the polymer chain.

Here, the expression "(meth)acrylate" refers to acrylate or methacrylate.

The self-dispersing polymer in the present invention is preferably an acrylic resin containing a structural unit derived from a (meth)acrylate monomer, preferably an acrylic resin containing a structural unit derived from an aromatic group-containing (meth)acrylate monomer, and still more preferably an acrylic resin containing a structural unit derived from an aromatic group-containing (meth)acrylate monomer at a content of from 10% by mass to 95% by mass. When the content of the aromatic group-containing (meth)acrylate monomer is from 10% by mass to 95% by mass, the stability of a self-emulsification or dispersed state improves, and, furthermore, an increase in the ink viscosity can be suppressed.

In the present invention, from the viewpoints of the stability of a self-dispersing state, stabilization of the particle shape in an aqueous medium through hydrophobic interaction between aromatic rings, and reducing the amount of water-soluble aqueous components by imparting appropriate hydrophobicity to the particle, the content of the aromatic group-containing (meth)acrylate monomer is more preferably from 15% by mass to 90% by mass, more preferably from 15% by mass to 80% by mass, and particularly preferably from 25% by mass to 70% by mass.

The self-dispersing polymer in the present invention may include, for example, a structural unit derived from an aromatic group-containing monomer and a structural unit derived from a dissociable group-containing monomer. Optionally, the self-dispersing polymer may further include another structural unit.

The monomer for forming another structural unit is not particularly limited as long as the monomer is copolymerizable with the aromatic group-containing monomer and the dissociable group-containing monomer. In particular, from the viewpoints of the flexibility of the polymer skeleton or ease of controlling the glass transition temperature (Tg), an alkyl group-containing monomer is preferable.

Examples of the alkyl group-containing monomer include (meth)acrylic ester monomers such as alkyl(meth)acrylate (such as methyl (meth)acrylate, ethyl (meth)acrylate, isopropyl(meth)acrylate, n-propyl(meth)acrylate, n-butyl (meth)acrylate, isobutyl (meth)acrylate, t-butyl (meth)acrylate, hexyl(meth)acrylate, and ethyl hexyl(meth)acrylate), ethylenic unsaturated monomers having a hydroxyl group (such as hydroxy methyl (meth)acrylate, 2-hydroxy ethyl (meth)acrylate, 2-hydroxy propyl(meth)acrylate, 4-hydroxy butyl (meth)acrylate, hydroxy pentyl(meth)acrylate, and hydroxy hexyl(meth)acrylate), and dialkyl amino alkyl(meth)acrylate (such as dimethyl amino ethyl (meth)acrylate); and (meth) acrylamide monomers such as N-hydroxy alkyl(meth)acrylamide (such as N-hydroxy methyl (meth)acrylamide, N-hydroxy ethyl (meth)acrylamide, and N-hydroxy butyl (meth) acrylamide), and N-alkoxy alkyl(meth)acrylamide (such as N-methoxy methyl (meth)acrylamide, N-ethoxy methyl (meth)acrylamide, N-(n-, iso)butoxy methyl (meth)acrylamide, N-methoxy ethyl (meth)acrylamide, N-ethoxy ethyl (meth)acrylamide and N-(n-, iso)butoxy ethyl (meth)acrylamide).

The molecular weight of the water-insoluble polymer forming the self-dispersing polymer particles is preferably from 3,000 to 200,000, more preferably from 5,000 to 150,000, and still more preferably from 10,000 to 100,000 in terms of weight average molecular weight. When the weight average molecular weight is 3,000 or more, the amount of water-soluble component can be effectively suppressed. When the weight average molecular weight is 200,000 or less, the stability of self-dispersing can be improved.

The weight average molecular weight is measured with a gel permeation chromatography (GPC). A GPC instrument, HLC-8220GPC (trade name, manufactured by Tosoh Corp.) is used; the columns (three in number) to be used are TSKgel Super HZM-H, TSKgel Super HZ4000, TSKgel Super HZ2000 (trade name, all manufactured by Tosoh Corp., 4.6 mm ID×15 cm); and THF (tetrahydrofuran) is used as an eluent. Regarding the GPC conditions, the sample concentration is 0.35% by mass, the flow rate is 0.35 ml/min, the sample injection amount is 10 μL, and a measurement temperature is 40° C. The detection is performed by using a RI detector (refractive index detector). The calibration curve is determined from the following 8 samples: "standard sample TSK standard, polystyrene": "F-40", "F-20", "F-4", "F-1", "A-5000", "A-2500", "A-1000", and "n-propylbenzene" (all trade names, all manufactured by Tosoh Corp.).

From the viewpoints of controlling the hydrophilicity/hydrophobicity of the polymer, the water-insoluble polymer for forming the self-dispersing polymer particles preferably includes a structural unit derived from an aromatic group-containing (meth)acrylate monomer (preferably a structural unit derived from phenoxyethyl(meth)acrylate and/or a structural unit derived from benzyl(meth)acrylate) at a copolymerization ratio of from 15% by mass to 80% by mass with respect to the total mass of the self-dispersing polymer particles.

From the viewpoints of controlling the hydrophilicity/hydrophobicity of the polymer, the water-insoluble polymer preferably includes a structural unit derived from an aromatic group-containing (meth)acrylate monomer at a copolymerization ratio of from 15% by mass to 80% by mass, a structural unit derived from a carboxyl group-containing monomer, and a structural unit derived from an alkyl group-containing monomer (preferably a structural unit derived from an alkyl ester of (meth)acrylic acid); more preferably includes a structural unit derived from phenoxyethyl(meth)acrylate and/or a structural unit derived from benzyl(meth)acrylate at a copolymerization ratio of from 15% by mass to 80% by mass, a structural unit derived from a carboxyl group-containing monomer, and a structural unit derived from an alkyl group-containing monomer (preferably a structural unit derived from an alkyl ester of (meth)acrylic acid that has from 1 to 4 carbon atoms). Furthermore, it is preferable that an acid value is from 25 to 100 and a weight-average molecular weight is from 3,000 to 200,000, and it is more preferable that an acid value is from 25 to 95 and a weight-average molecular weight is from 5,000 to 150,000 are more preferable.

Hereinafter, specific examples of the water-insoluble polymer for forming the self-dispersing polymer particles (Exemplary compounds B-01 to B-19) are shown. However, the water-insoluble polymer in the present invention is not limited thereto. The numbers in parentheses indicate the mass ratios of copolymerization components.

B-01: phenoxy ethyl acrylate/methyl methacrylate/acrylic acid copolymer (50/45/5)

B-02: phenoxy ethyl acrylate/benzyl methacrylate/isobutyl methacrylate/methacrylic acid copolymer (30/35/29/6)

B-03: phenoxy ethyl methacrylate/isobutyl methacrylate/methacrylic acid copolymer (50/44/0.6)

B-04: phenoxy ethyl acrylate/methyl methacrylate/ethyl acrylate/acrylic acid copolymer (30/55/10/5)

B-05: benzyl methacrylate/isobutyl methacrylate/methacrylic acid copolymer (35/59/6)

B-06: styrene/phenoxy ethyl acrylate/methyl methacrylate/acrylic acid copolymer (10/50/35/5)

B-07: benzyl acrylate/methyl methacrylate/acrylic acid copolymer (55/40/5)

B-08: phenoxy ethyl acrylate/benzyl acrylate/methacrylic acid copolymer (45/47/8)

B-09: styrene/phenoxy ethyl acrylate/butyl methacrylate/acrylic acid copolymer (5/48/40/7)

B-10: benzyl methacrylate/isobutyl methacrylate/cyclohexyl methacrylate/methacrylic acid copolymer (35/30/30/5)

B-11: phenoxy ethyl acrylate/methyl methacrylate/butyl acrylate/methacrylic acid copolymer (12/50/30/8)

B-12: benzyl acrylate/isobutyl methacrylate/acrylic acid copolymer (93/2/5)

B-13: styrene/phenoxy ethyl methacrylate/butyl acrylate/acrylic acid copolymer (50/5/20/25)

B-14: styrene/butyl acrylate/acrylic acid copolymer (62/35/3)

B-15: methyl methacrylate/phenoxy ethyl acrylate/acrylic acid copolymer (45/51/4)

B-16: methyl methacrylate/phenoxy ethyl acrylate/acrylic acid copolymer (45/49/6)

B-17: methyl methacrylate/phenoxy ethyl acrylate/acrylic acid copolymer (45/48/7)

B-18: methyl methacrylate/phenoxy ethyl acrylate/acrylic acid copolymer (45/47/8)

B-19: methyl methacrylate/phenoxy ethyl acrylate/acrylic acid copolymer (45/45/10)

The manufacturing method of the water-insoluble polymer for forming the self-dispersing polymer particles in the present invention is not particularly limited. Examples of the manufacturing method include a method of performing emulsion polymerization in the presence of a polymerizable surfactant so as to covalently bond the surfactant to the water-insoluble polymer, and a method of copolymerizing a monomer mixture containing the hydrophilic group-containing monomer and the aromatic group-containing monomer by a known polymerization process such as a solution polymerization method or a bulk polymerization method. Among these, from the viewpoints of aggregation speed and ejection stability of an ink composition containing the self-dispersing polymer particles, a solution polymerization method is preferable, and a solution polymerization method using an organic solvent is more preferable.

From the viewpoints of aggregation speed, the self-dispersing polymer in the present invention preferably includes a polymer synthesized in an organic solvent, wherein the polymer has carboxyl groups, all or some of the carboxyl groups of the polymer are neutralized (preferably with an acid value of from 25 to 50), and the polymer is prepared in the form of a polymer dispersion in which water forms a continuous phase. That is, the manufacturing method of the self-dispersing polymer particles in the present invention preferably includes a process of synthesizing a polymer in an organic solvent and a dispersing process of forming an aqueous dispersion in which at least some of the carboxyl groups of the polymer are neutralized.

The dispersing process preferably include the following substeps (1) and (2).

Substep (1): a step of stirring a mixture containing a polymer (water-insoluble polymer), an organic solvent, a neutralizing agent, and an aqueous medium.

Substep (2): a step of removing the organic solvent from the mixture.

The substep (1) is preferably a process in which the polymer (water-insoluble polymer) is dissolved in the organic solvent, and, subsequently, the neutralizing agent and the aqueous medium are gradually added to the polymer solution and mixed, by stirring, with the polymer solution, thereby forming a dispersion. When the neutralizing agent and the aqueous medium are added to the solution of the water-insoluble polymer in which the water-insoluble polymer is dissolved in the organic solvent as in the above process, self-dispersing polymer particles whose particle diameter is highly stable during storage can be obtained without requiring a strong shearing force.

The stirring method of the mixture is not particularly limited, and may be a method using a generally-used mixing and stirring apparatus and/or, if necessary, a disperser such as an ultrasonic disperser or a high pressure homogenizer.

Preferable examples of the organic solvent include an alcohol solvent, a ketone solvent and an ether solvent.

Examples of the alcohol solvent include isopropyl alcohol, n-butanol, t-butanol, and ethanol. Examples of the ketone solvent include acetone, methyl ethyl ketone, diethyl ketone, and methyl isobutyl ketone. Examples of the ether solvent include dibutyl ether and dioxane. Among these solvents, a ketone solvent such as methyl ethyl ketone and an alcohol solvent such as isopropyl alcohol are preferable. For the purpose of relieving polarity change at the time of phase inversion from an oil system to an aqueous system, it is also preferable to use isopropyl alcohol and methyl ethyl ketone together. The use of the solvents together can produce self-dispersing polymer particle having a very small particle diameter and a high dispersion stability that are free from aggregation precipitation or adhesion between the particles.

The neutralizing agent is used to neutralize all or some of the dissociable groups, whereby the self-dispersing polymer gets into a stable emulsified or dispersed state in water. When the self-dispersing polymer according to the present invention includes an anionic dissociable group as a dissociable group (for example, a carboxyl group), examples of the neutralizing agent to be used include a basic compound such as an organic amine compound ammonia or an alkali metal hydroxide. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethyl-ethanolamine, 2-dimethylamino-2-methyl-1-propanol, 2-amino-2-methyl-1-propanol, N-methyl diethanolamine, N-ethyl diethanolamine, monoisopropanolamine, diisopropanolamine, and tri isopropanolamine. Examples of the alkali metal hydroxide include lithium hydroxide, sodium hydroxide, and potassium hydroxide. Among them, sodium hydroxide, potassium hydroxide, triethylamine, and triethanolamine are preferable, from the viewpoints of the dispersion stability of the self-dispersing polymer particles according to the present invention in water.

The amount of the basic compound to be used is preferably from 5 mol % to 120 mol %, more preferably from 10 mol % to 110 mol %, and still more preferably from 15 mol % to 100 mol %, with respect to 100 mol % of the dissociable groups. When the amount of the basic compound is 5 mol % or more, an effect in terms of stabilizing the dispersion of the particles in water can be obtained. When the amount of the basic compound is 120 mol % or less, an effect of decreasing water-soluble components can be obtained.

In the substep (2), the organic solvent is removed, by distillation, from the dispersion obtained in the substep (1) using a commonly-used method such as reduced-pressure distillation, whereby phase inversion into an aqueous system occurs and an aqueous dispersion of the self-dispersing polymer particles can be obtained. The organic solvent has substantially been removed from the obtained aqueous dispersion, and the amount of the remaining organic solvent is preferably 0.2% by mass or less, and more preferably 0.1% by mass or less.

The average particle diameter of the polymer particles is preferably in a range of from 1 nm to 70 nm, more preferably in a range of from 2 nm to 60 nm, and still more preferably in a range of from 2 nm to 30 nm in terms of the volume-average particle diameter. When the volume-average particle diameter is 2 nm or more, production suitability is improved. When the volume-average particle diameter is 70 nm or less, local blocking resistance is improved.

The particle size distribution of the self-dispersing polymer particles is not particularly limited, and may have a wide particle size distribution or a mono-dispersed particle size distribution. Two or more kinds of the water-insoluble particles may be mixed and used.

The average particle diameter and particle size distribution of the self-dispersing polymer particles are obtained by measuring the volume average particle diameter of the particles by a dynamic light scattering method using a NANOTRACK particle size distribution measuring apparatus UPA-EX 150 (trade name, manufactured by Nikkiso Co., Ltd.).

The glass transition temperature (Tg) of the self-dispersing polymer is preferably 70° C. or more, more preferably 80° C. or more, and still more preferably 100° C. or more. When the glass transition temperature (Tg) is 70° C. or more, local blocking resistance is improved. An upper limit of the glass transition temperature (Tg) is not particularly restricted.

With respect to the self-dispersing polymer particles, one kind of the self-dispersing polymer particle may be used alone or two or more kinds of the self-dispersing polymer particles may be mixed and used. The content of the self-dispersing polymer in the ink composition is preferably from 1% by mass to 10% by mass, and more preferably from 1% by mass to 5% by mass with respect to the ink composition, from the viewpoints of aggregation speed and the glossiness of an image.

As an example of preferable polymer particles, the self-dispersing polymer particles have been described as examples, but the polymer particles are not limited to the self-dispersing polymer particles, and other polymer particles can be used. For example, polymer particles such as a commonly-known emulsion polymerization latex, can be preferably used by adjusting, for example, a configuration of monomers, emulsifier, or dispersing conditions.

Initiator

The ink composition in the present invention may contain at least one kind of initiator that initiates polymerization of the water-soluble polymerizable compound when irradiated with active energy rays. The initiator may be included only in the below-described treatment liquid or may be included in both the ink composition according to the present invention and the treatment liquid. With respect to the initiator, one kind of the initiator may be used, or two or more kinds of the initiator may be mixed and used. The initiator may be used together with a sensitizer.

The initiator may be appropriately selected from a compound that can initiate a polymerization reaction when irradiated with active energy rays, and examples thereof include an initiator (for example, photopolymerization initiator) that generates an active species (such as a radical, an acid, or a base) when irradiated with radioactive rays, light, or electron beam.

Examples of the photopolymerization initiator include acetophenone, 2,2-diethoxy acetophenone, p-dimethylamino acetophen, p-dimethyl amino propiophenone, benzophenone, 2-chlorobenzophenone, p,p'-dichlorobenzophene, p,p'-bis diethyl amino benzophenone, Michler's ketone, benzyl, benzoin, benzoinmethyl ether, benzomethyl ether, benzoin isopropylether, benzoin n-propylether, benzoinisobutyl ether, benzoin-n-butyl ether, benzyl dimethyl ketal, tetramethyl thiuram monosulfide, thioxanthone, 2-chlorothioxanthone, 2-methyl thioxanthone, azobisisobutyronitrile, benzoin peroxide, di-tert-butyl peroxide, 1-hydroxy cyclohexyl phenyl ketone, 1-[4-(2-hydroxy ethoxy)-phenyl]-2-hydroxy-2-methyl-1-propane-1-one, 2-hydroxy-2-methyl-1-phenyl-1-one, 1-(4-isopropylphenyl)-2-hydroxy-2-methyl propane-1-one, and methyl benzoyl formate. Furthermore, for example, aromatic diazonium salts, aromatic halonium salts, aromatic sulfonium salts, and metallocene compounds, such as triphenyl sulfonium hexafluorophosphate and diphenyl iodonium hexafluoro antimonate, can be included.

When the ink composition contains an initiator, the content of the initiator in the ink composition is preferably from 1% by mass to 40% by mass, and more preferably from 5% by mass to 30% by mass, with respect to the water-soluble polymerizable compound. When the content of the initiator is of 1% by mass or more, the scratch resistance of an image is further improved, which is preferable in high-speed recording. A content of 40% by mass or less is preferable from the standpoint of ejection stability.

Examples of the sensitizer include an amine-containing compound (for example, aliphatic amines, amines including an aromatic group, and piperidine), a urea (for example, allyl-containing urea and o-tolythiourea), a sulfur-containing compound (for example, sodium diethyl dithiophosphate and a soluble salt of an aromatic sulfinic acid), a nitrile-containing compound (for example, N,N,-disubstituted p-amino benzonitrile), a phosphorous-containing compound (for example, tri-n-butyl phosphine, sodium diethyl dithio phosphate), a nitrogen-containing compound (for example, Michler's ketone, a N-nitrosohydroxylamine derivative, an oxazolidine compound, a tetrahydro 1,3 oxyazine compound, a condensate of a diamine with formaldehyde or acetoaldehyde), a chlorine-containing compound (for example, a carbon tetrachloride and hexachloroethane), a polymerized amine that is a reaction product of an epoxy resin and an amine, and triethanolamine triacrylate.

The sensitizer may be contained as long as the effects of the present Invention are not impaired.

Water

The ink composition contains water, and the amount of water is not particularly limited. However, the content of water is preferably from 10% by mass to 99% by mass, more preferably from 30% by mass to 80% by mass, and still more preferably from 50% by mass to 70% by mass with respect to the ink composition.

Other Additives

The ink composition in the present invention may further include other additives other than the above components. Examples of the other additives include a known additive such as a polymerization inhibitor, an anti-drying agent (wetting agent), an anti-fading agent, an emulsification stabilizer, a penetration accelerating agent, an ultraviolet absorbing agent, a preservative, an antifungal agent, a pH adjuster, a surface tension adjuster, a defoamer, a viscosity modifier, a dispersion stabilizer, an anticorrosive agent, or a chelating agent. When these additives are added to the ink composition, these additives are usually directly added to the ink composition. When an oil dye is used as a dispersion, these additives are usually added to the dispersion after the preparation of a dye dispersion. However, the additives may be added to an oil phase or an aqueous phase during the preparation of the dye dispersion.

The ultraviolet absorbing agent can improve the storability of an image. Examples of the ultraviolet absorbing agent include benzotriazole-containing compounds such as those described in JP-A No. 58-185677, JP-A No. 61-190537, JP-A No. 2-782, JP-A No. 5-197075, and JP-A No. 9-34057; benzophenone-containing compounds such as those described in JP-A No. 46-2784, JP-A No. 5-194483, U.S. Pat. No. 3,214,463; cinnamic acid-containing compounds such as those described in Japanese Examined Patent Application Publication (JP-B) No. 48-30492, JP-B No. 56-21141, and JP-A No. 10-88106; triazine-containing compounds such as those described in JP-A No. 4-298503, JP-A No. 8-53427, JP-A No. 8-239368, JP-A No. 10-182621, and PCT Japanese Translation Patent Publication (JP-T) No. 8-501291, compounds described in Research Disclosure No. 24239 and so-called fluorescent brighteners that emit fluorescent light upon absorption of UV rays such as stilbene-containing compounds and benzoxazole-containing compounds.

The anti-fading agent can improve the storability of an image. Examples of the anti-fading agent include an organic anti-fading agent and a metal complex anti-fading agent. Examples of the organic anti-fading agent include hydroquinones, alkoxy phenols, dialkoxy phenols, phenols, anilines, amines, indanes, chromanes, alkoxy anilines, and heterocycles. Examples of the metal complex anti-fading agent include nickel complexes and zinc complexes. More specific examples thereof include compounds such as those described in patents cited in the section I or J in Chapter VII of Research Disclosure No. 17643, Research Disclosure No. 15162, in the left column on page 650 in Research Disclosure No. 18716, in page 527 of Research Disclosure No. 36544, in page 872 of Research Disclosure No. 307105, Research Disclosure No. 15162 and compounds within the scope of the formulae and examples of the representative compounds described in pages 127 to 137 of JP-A No. 62-215272.

Examples of the antifungal agent include sodium dehydroacetate, sodium benzoate, sodium pyridinethione-1-oxide, p-hydroxy benzoate ethyl ester, 1,2-benzisothiazoline-3-one and a salt thereof. The content of the antifungal agent is preferably in a range of from 0.02% by mass to 1.00% by mass with respect to the ink composition.

As the pH adjuster, a neutralizing agent (organic base, inorganic alkali) may be used. The pH adjuster can improve the stability of the ink composition during storage. The pH adjuster is added to the extent that the pH of the ink composition is preferably from 6 to 10, and more preferably from 7 to 10.

Examples of the surface tension adjuster include nonionic surfactants, cationic surfactants, anionic surfactants, and betaine surfactants. The amount of the surface tension adjuster is preferably added in such an amount that the surface tension of the ink composition is preferably in a range of from 20 mN/m to 60 mN/m, more preferably in a range of from 20 mN/m to 45 mN/m, and still more preferably in a range of from 25 mN/m to 40 mN/m. When the surface tension adjuster is added in an amount in the above range, the ink composition is ejected in a favorable manner using an ink jet method.

Specific preferable examples of the surfactant include, as hydrocarbon surfactants, anionic surfactants such as fatty acid salt, alkyl sulfate ester salt, alkyl benzene sulfonate, alkyl naphthalene sulfonate, dialkyl sulfosuccinate, alkyl phosphate ester salt, naphthalene sulfonate formalin condensate, or polyoxyethylene alkyl sulfate ester salt; and nonionic surfactants such as polyoxyethylene alkyl ether, polyoxyethylene alkyl allyl ether, polyoxyethylene fatty acid ester, sorbitan fatty acid ester, polyoxyethylene sorbitan fatty acid ester, polyoxyethylene alkyl amine, glycerin fatty acid ester, or oxyethylene oxypropylene block copolymer. In addition, an acetylene-based polyoxyethylene oxide surfactant such as SURFYNOLS (trade name, manufactured by Air Products & Chemicals Inc.) is also preferably used. In addition, an amine oxide-type ampholytic surfactant such as N,N-dimethyl-N-alkyl amine oxide is also preferred.

Furthermore, surfactants described in pages 37 and 38 of JP-A No. 59-157636 and Research Disclosure No. 308119 (in 1989) may also be used.

By using, for example, fluorine (alkyl fluoride) surfactants or silicone surfactants described in JP-A No. 2003-322926, JP-A No. 2004-325707, and JP-A No. 2004-309806, scratch resistance can be improved.

These surface tension adjusters may also be used as a defoamer, and chelating agents represented by fluorine compounds, silicone compounds, and EDTA may also be used.

Ink Set

Treatment Liquid

The ink composition according to the present invention may be used with a treatment liquid including an aggregating agent that is capable of aggregating components in the ink composition to form an ink set. The treatment liquid includes at least an aggregating agent that is capable of aggregating the above-described components in the ink composition, but may further include other components if necessary. Since the treatment liquid is used with the ink composition, ink jet recording can be performed at a higher speed, and an image excellent in terms of the image-printing properties with a high density and high resolution (for example, reproducibility of thin lines and minute portions) can be obtained even when recording is performed at a high-speed.

The aggregating agent may be a compound that is capable of changing the pH of the ink composition, a polyvalent metal salt, or polyallylamines such as a polymer having quaternary or tertiary amine. In the present invention, from the viewpoints of the aggregating property of the ink composition, a compound that can change the pH of the ink composition is preferable, and a compound that can decrease the pH of the ink composition is more preferable.

Examples of the compound capable of decreasing the pH of the ink composition include an acidic substance.

Preferable examples of the acidic substance include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumalic acid, thiophene carboxylic acid, nicotine acid, and derivatives thereof, and salts thereof.

With respect to the acidic substance, one kind of the acidic substance may be used alone or two or more kinds of the acidic substances may be used in combination.

When the treatment liquid in the present invention includes an acidic substance, the pH (25° C.) of the treatment liquid is preferably 6 or less, and more preferably 4 or less. In particular, the pH (25° C.) is preferably in a range of from 1 to 4, and particularly preferably in a range of from 1 to 3. In such a case, the pH (25° C.) of the ink composition is preferably 7.5 or more (more preferably 8.0 or more).

Among the above, from the viewpoints of image density, resolution, and an ink jet recording at a higher speed, it is preferable that the pH (25° C.) of the ink composition be 8.0 or more and the pH (25° C.) of the treatment liquid is from 0.5 to 4.

Among the above, as the aggregating agent in the present invention, a highly water-soluble acidic substance is preferable. From the viewpoints of increasing aggregation property and immobilizing the entire ink, the aggregating agent in the present invention is preferably an organic acid, more preferably a di or higher-valent organic acid, and particularly preferably a divalent to trivalent acidic substance. The di or higher-valent organic acid is preferably an organic acid having a first pKa of 3.5 or less, and more preferably an organic acid having a first pKa of 3.0 or less. Specific preferable examples thereof include phosphoric acid, oxalic acid, malonic acid, and citric acid.

Examples of the polyvalent metal salt include a salt of alkali earth metal which belongs to Group 2 of the periodic table (for example, magnesium and calcium), a salt of transition metal which belongs to Group 3 of the periodic table (for example, lanthanum), a salt of a metal from Group 13 of the periodic table (for example, aluminum), and a salt of lanthanides (for example, neodymium). Preferable examples of the salt of the above metals include carboxylic acid salt (such as formate, acetate, or benzoate), nitrate, chloride, and thiocyanate. Among them, a calcium salt or magnesium salt of carboxylic acid (formic acid, acetic acid, and benzoic acid), a calcium salt or magnesium salt of nitric acid, calcium chloride, magnesium chloride, and a calcium salt or magnesium salt of thiocyanic acid are preferable.

With respect to the aggregating agent, one kind of the aggregating agent may be used alone or two or more kinds of the aggregating agents may be mixed and used.

The content of the aggregating agent that is capable of aggregating the ink composition in the treatment liquid is preferably from 1% by mass to 50% by mass, more preferably from 3% by mass to 45% by mass, and still more preferably in a range of from 5% by mass to 40% by mass with respect to the treatment liquid.

The treatment liquid may further contain other additives as additional components as long as the effects of the present invention are not impaired. Examples of other additives include known additives such as an anti-drying agent (wetting agent), an anti-fading agent, an emulsification stabilizer, a penetration accelerating agent, an ultraviolet absorbing agent, a preservative, an antifungal agent, a pH adjuster, a surface tension adjuster, a defoamer, a viscosity modifier, a dispersant, a dispersion stabilizer, an anticorrosive agent, and a chelating agent.

Image Forming Method

The ink jet image forming method according to the present invention includes an ink ejection process in which an image is formed by ejecting the ink composition on a recording medium from an ink jet head (preferably an ink jet head having a silicon nozzle plate) and other processes if necessary.

In the present invention, it is preferable to further include a treatment liquid applying process that applies, on a recording medium, a treatment liquid that is capable of forming an aggregate when the treatment liquid is brought into contact with the ink composition.

According to an aspect using the polymer particles of the present invention, the ink composition for forming an ink image includes polymer particles and a water-soluble polymerizable compound that can be cured through polymerization, together with a pigment. Due to this configuration, an image is fixed by an aggregation reaction of the pigment and/or the polymer particles when the ink composition contacts the treatment liquid. Further, the polymer particles are present between particles of the pigment, and the water-soluble polymerizable compound, which is in the state of being incorporated into a space among such particles in the fixed image, is cured through polymerization, whereby the strength of the final image is increased. In other words, using the treatment liquid, components in the ink composition are aggregated rapidly to prevent intermixing of ink droplets (such as bleed or intercolor mixing) and, as a result, suitability for high-speed recording and effects in improving the hue and image printing properties (including reproducibility of thin lines and minute portions in an image) during high-speed recording are imparted, while the water-soluble polymerizable compound enters, to an appropriate extent, into a space among the pigment particles and the polymer particles that are in a coagulated state. Since the water-soluble polymerizable compound is polymerized and cured in this state, the image strength can be improved, and suitability for high-speed recording and improvement in the rubbing resistance of an image can be both achieved.

Particularly, the present invention is more effective when recording is performed on a coated paper, as a recording medium having a surface at which the pigment tends to remain.

Hereinafter, each process included the image forming method according to the present invention is described.

Ink Ejection Process

In an ink ejection process, the above-described ink composition for ink jet according to the present invention is applied on a recording medium from an ink jet head having a silicon nozzle plate by an ink jet method. In the present process, it is possible to selectively apply the ink composition on a recording medium to form a desired visible image. According to the present invention, details of the ink composition such as details and preferable aspects of each component are the same as described above.

Specifically, image recording by an ink jet method may be conducted by ejecting a liquid composition onto a desired recording medium by application of energy. The recording medium is, for example, a common paper, a resin coated paper, a paper exclusively for ink jet recording described in, for example, JP-A No. 8-169172, JP-A No. 8-27693, JP-A No. 2-276670, JP-A No. 7-276789, JP-A No. 9-323475, JP-A No. 62-238783, JP-A No. 10-153989, JP-A No. 10-217473, JP-A No. 10-235995, JP-A No. 10-217597, and JP-A No. 10-337947, a film, an electrophotographic paper, a fabric, glass, a metal, and a ceramic. Meanwhile, a preferable ink jet recording method for the present invention may include a method described in paragraphs [0093] to [0105] of JP-A No. 2003-306623.

The ink jet method is not particularly limited, and may be any known method such as a charge-control method in which an ink is ejected by an electrostatic attraction force, a drop-on-demand method (pressure-pulse method) in which a pressure of oscillation of a piezo element is utilized, an acoustic ink jet method in which an ink is ejected by radiation pressure generated by irradiation of ink with acoustic beams that have been converted from electrical signals, and a thermal ink jet (BUBBLE JET (registered trade mark) method in which an ink is ejected by a pressure generated by formation of bubbles caused by heating of the ink. Further, examples of the ink jet method include a method in which a large number of small-volume droplets of an ink having a low optical density, which is called a photo ink, are ejected, a method in which plural inks with substantially the same hue but different densities are used to improve image quality, and a method in which a colorless and transparent ink is used.

The ink jet head used in the ink jet method may be an on-demand mode or a continuous mode. Specific examples of ejecting systems include electromechanical transduction systems (for example, single cavity system, double cavity system, vendor system, piston system, share mode system, and shared wall system), electrothermal transduction systems (for example, thermal ink jet system and BUBBLE JET (registered trade mark) system), electrostatic suction systems (for example, electric-field control system and slit jet system) and electrical discharge systems (for example, spark jet system), but any ejecting systems is applicable.

An ink nozzle or the like used when conducting recording by the ink jet method is not particularly limited, and may be appropriately selected according to purpose.

Examples of the ink jet method include (i) a shuttle mode in which recording is performed while a short serial head having a small length is moved in the width direction of a recording medium in a scanning manner, and (ii) a line mode in which a line head having recording devices that are aligned correspondingly to the entire length of one side of a recording medium is used. In the line mode, image recording can be performed over the whole of one surface of a recording medium by moving the recording medium in a direction orthogonal to the disposal direction along which the recording devices are aligned, and a conveyance system such as a carriage that moves the short head in a scanning manner is not required. Since complicated scan-movement control of the movement of the carriage and the recording medium is not required and only the recording medium is moved, a faster recording speed can be achieved compared to the shuttle mode. The ink jet recording method according to the present invention can be applied to both of these modes, but when the ink jet recording method according to the present invention is applied to a line mode, in which dummy jetting is not generally conducted, the effects of improving ejection accuracy and the scratch resistance of an image are significant.

From the viewpoints of obtaining a highly defined image, the amount of ink droplets ejected from an ink jet head is preferably from 0.5 µL to 6 µL (picoliter), more preferably from 1 µL to 5 µL, and still more preferably from 2 µL to 4 µL.

Ink Jet Head having a Silicon Nozzle Plate

An ink jet head that may be preferably used for the image forming method according to the present invention includes a nozzle plate in which at least a part of nozzle plate is formed from silicon. FIG. 1 is a cross-sectional view schematically showing an example of the internal structure of an ink jet head.

As shown in FIG. 1, the ink jet head 100 includes nozzle plate 11 having ejection ports (nozzles), and ink supply unit 20 positioned to the side opposite to the ejection direction of the nozzle plate. Nozzle plate 11 includes plural ejection ports 12 that eject an ink.

Figure 2:
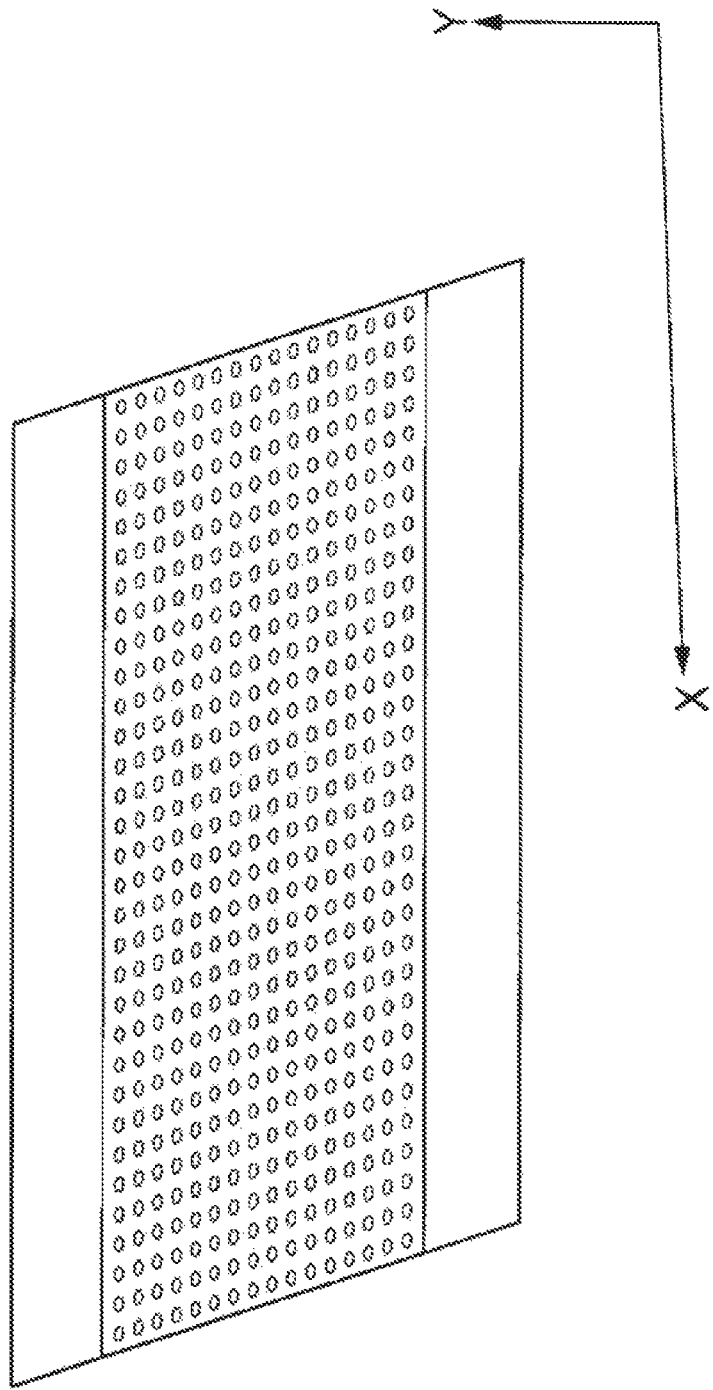
FIG. 2 is a view schematically showing an example of an ejection port alignment of a nozzle plate.

As shown in FIG. 2, nozzle plate 11 has 32×60 ejection ports (nozzles) arranged in a two-dimensional manner. At least a part of this nozzle plate is formed from silicon and the nozzle plate has a structure in which silicon is exposed at the inner wall of nozzles and the plate surface of the nozzle plate at the ink ejection direction side. Although not shown, a liquid-repellent film is provided on at least a part of the plate surface of nozzle plate 11 at the ink ejection direction side. In FIG. 2, direction Y represents a direction in which a recording medium is conveyed (subscanning direction), and direction X represents the longer side of the line head (main scanning direction).

Ink supply unit 20 includes plural pressure chambers 21 connected with each of plural ejection ports 12 of nozzle plate 11 via nozzle connection path 22, respectively; plural ink supply paths 23 supplying an ink to plural pressure chambers 21, respectively; common liquid reservoir 25 supplying an ink to plural ink supply paths 23; and a pressure-generating unit 30 deforming each of plural pressure chambers 21.

Ink supply path 23 is formed between nozzle plate 11 and pressure-generating unit 30, and an ink supplied to the common liquid reservoir 25 is delivered to ink supply path 23. Ink supply passage 23 is connected with an end of supply adjustment path 24 that connects ink supply passage 23 with pressure chamber 21. It is possible to deliver an ink which has been supplied from ink supply path 23 to pressure chamber 21 while controlling the amount of the ink to a desired amount. Plural supply adjustment paths 24 are provided to ink supply path 23, and an ink is supplied to pressure chamber 21 that is positioned adjacent to pressure-generating unit 30 via ink supply passage 23.

In this way, a large amount of ink can be supplied to plural ejection ports.

Pressure-generating unit 30 (piezoelectric element) includes vibrating plate 31, adhesion layer 23, lower electrode 33, piezoelectric body layer 34, and upper electrode 35 superposed in this order from pressure chamber 21 side, and is connected with electrical wirings supplying driving signals from outside. The piezoelectric element deforms according to the image signal so that an ink is ejected from nozzles 12 via nozzle connection paths 22.

Circulation aperture 41 is provided around ejection ports 12, and ink is always collected by circulation path 42. In this way, increase in viscosity of the ink on and around ejection ports when jetting is not performed is prevented.

Treatment Liquid Applying Process

In a treatment liquid applying process, a treatment liquid that is capable of forming an aggregate when the treatment liquid is brought into contact with the ink composition is applied onto a recording medium, and the treatment liquid is brought into contact with the ink composition, thereby forming an image. In this process, the dispersed particles in the ink composition such as polymer particles and colorants (for example, a pigment), are aggregated, whereby the image is fixed onto the recording medium. Details of each component and preferable aspects of the treatment liquid are the same as those described above.

The treatment liquid may be applied by a known method such as a coating method, an ink jet method, or an immersion method. Examples of the coating method include known coating methods using a bar coater, an extrusion die coater, an air doctor coater, a blade coater, a rod coater, a knife coater, a squeeze coater, and a reverse roll coater. Details of the ink jet method are the same as those described above.

The treatment liquid applying process may be performed either before or after the ink ejection process using the ink composition.

In the present invention, it is preferable to perform the ink ejection process after applying the treatment liquid in the treatment liquid applying process. That is, in a preferable embodiment, the treatment liquid for aggregating the colorant (preferably pigment) in the ink composition is applied in advance on a recording medium before ejecting the ink composition, and the ink composition is ejected so as to contact with the treatment liquid applied on the recording medium, thereby forming an image. As a result, ink jet recording can be carried out at a high speed, and an image with a high density and resolution can be obtained even when recording is performed at a high speed.

The amount of the treatment liquid to be applied is not particularly limited as long as the ink composition can be aggregated, and is preferably $0.1$ $g/m^2$ or more in terms of the amount of applied aggregating agent (for example, a di or higher-valent carboxylic acid or a cationic organic compound). The amount of the applied aggregating agent is preferably in a range of from $0.1$ $g/m^2$ to $1.0$ $g/m^2$, and more preferably in a range of from $0.2$ $g/m^2$ to $0.8$ $g/m^2$. When the amount of the applied aggregating agent is $0.1$ $g/m^2$ or more, the aggregation reaction proceeds smoothly. The applied aggregating agent amount of $1.0$ $g/m^2$ or less is preferable since excessive increase in the degree of glossiness does not occur.

In the present invention, it is also preferable that the ink ejection process is performed after the treatment liquid applying process, and further, a heat-drying process of drying the treatment liquid on a recording medium by heating is performed during a time period after the application of the treatment liquid on a recording medium until the ejection of the ink composition. By drying the treatment liquid by heating prior to the ink ejection process, the ink coloring properties such as suppression of bleed are improved, and a visible image having superior color density and hue can be recorded.

The drying by heating may be performed by a known heating means such as a heater or the like, or an air-blowing means using air-blowing by a drier or the like, or a means having a combination thereof. Examples of heating methods include a method of supplying heat from the side of the recording medium opposite to the surface on which the treatment liquid has been applied using a heater or the like, a method of blowing warm air or hot air to the recording medium on which the treatment liquid has been applied, and a heating method using an infrared heater, and a combination of two or more of the above methods.

Heat-Fixing Process

The image forming method according to the present invention preferably includes, after the ink ejection process, a heat-fixing process in which the ink image that has been formed by the application of the ink composition is fixed by heating when a heated surface contact with the ink image. By conducting a heat-fixing treatment, images are fixed on a recording medium, and the scratch resistance of the image can be further improved.

The heating method is not particularly limited, and preferable examples thereof include non-contact heating methods such as a method of heating with a heating body (such as a nichrome wire heater), a method of supplying warm air or hot air, and a method of heating with, for example, a halogen lamp or an infrared lamp. The heating and pressurizing method is not particularly limited, either. Preferable examples thereof include contact heat-fixing methods such as a method of pressing a heated plate against an image forming surface of the recording medium, and a method of passing the recording medium through a contact portion between a roller/belt and another roller/belt by using a heat-pressurizing apparatus which includes a pair of heat-pressurizing rollers, a pair of heat-pressurizing belts, or a heat-pressurizing belt arranged at an image-recording surface side of the recording medium and a retention roller arranged at a side of the recording medium opposite to the heat-pressurizing belt side.

Active Energy Ray Irradiation Process

In the image forming method according to the present invention, it is preferable to include an active energy ray irradiation process. The active energy ray irradiation process refers to a process that irradiates, for example, an ultraviolet ray from an ultraviolet irradiation lamp to an ink image formed by application of the ink composition. As a result, monomer components in the image can be reliably cured by polymerization. At this time, when an ultraviolet irradiation lamp is arranged at opposite to the recorded surface of a recording medium and the entire recorded surface is irradiated, the whole image can be cured. The light source that radiates active energy rays is not limited to an ultraviolet irradiation lamp, and it is possible to use a halogen lamp, a high-pressure mercury lamp, a laser, an LED, an electron ray irradiation apparatus, or the like.

The active energy ray irradiation process may be performed either before or after the heat-drying process or may be performed both before and after the heat-drying process as long as the active energy ray irradiation process is performed after the ink ejection process and the treatment liquid applying process.

Recording Medium

According to the image forming method of the present invention, an image is recorded on a recording medium.

The recording medium is not particularly limited, and may be a general printing paper containing cellulose as the major component such as a high-quality paper, a coat paper, or an art paper, which is used for general offset printing and the like. When image recording is performed on the general printing paper containing cellulose as the major component by a general ink jet method using an aqueous ink, absorption and drying of the ink is relatively slow, and colorant migration easily occurs after ejecting ink droplets, whereby image quality is apt to degrade. In contrast, when image recording is conducted by the ink jet recording method according to the present invention, a high-grade image recording having excellent color density and hue can be achieved while suppressing the colorant migration.

The recording medium may be a commercially-available product, and examples thereof include high-quality papers (A) such as PRINCE WOOD FREE (tradename) manufactured by Oji Paper Co., Ltd., SHIRAOI (tradename) manufactured by Nippon Paper Industries Co., Ltd., and New NPI jo-shitsu (New NPI high-quality; tradename) manufactured by Nippon Paper Industries Co., Ltd.; very light-weight coated papers such as EVER LIGHT COATED (tradename) manufactured by Oji Paper Co., Ltd. and AURORA S (tradename) manufactured by Nippon Paper Industries Co., Ltd.; lightweight coat papers (A3) such as TOPKOTE (L) (tradename) manufactured by Oji Paper Co., Ltd. and AURORA L (tradename) manufactured by Nippon Paper Industries Co., Ltd.; coat papers (A2, B2) such as TOPKOTE PLUS (tradename) manufactured by Oji Paper Co., Ltd. and AURORA COAT (tradename) manufactured by Nippon Paper Industries Co., Ltd.; and art papers (A1) such as KINFUJI(2/SIDE GOLDEN CASK GLOSS) (tradename) manufactured by Oji Paper Co., Ltd. and TOKUBISHI ART (tradename) manufactured by Mitsubishi Paper Mills Ltd. As the recording medium, various inkjet-recording papers exclusively for photos may be used.

Among the above, from the viewpoints of obtaining a significant effect in terms of suppressing colorant migration and obtaining a high-quality image having more favorable color density and hue than conventionally, a recording medium having a water absorption coefficient Ka of from $0.05 \, mL/m^2 \cdot ms^{1/2}$ to $0.5 \, mL/m^2 \cdot ms^{1/2}$ is preferable, a recording medium having a water absorption coefficient Ka of from $0.1 \, mL/m^2 \cdot ms^{1/2}$ to $0.4 \, mL/m^2 \cdot ms^{1/2}$ is more preferable, and a recording medium having a water absorption coefficient Ka of from $0.2 \, mL/m^2 \cdot ms^{1/2}$ to $0.3 \, mL/m^2 \cdot ms^{1/2}$ is still more preferable.

The water absorption coefficient Ka has the same definition as those described in JAPAN TAPPI Pulp and Paper Testing Method No. 51: 2000 (published by JAPAN TAPPI), and, specifically, the water absorption coefficient Ka is calculated from a difference between the transfer amount of water at a contact time of 100 ms and that at a contact time of 900 ms measured using an automatic scanning liquid absorptometer KM500Win (trade name, manufactured by Kumagairiki Riki Kogyo Co., Ltd.).

Among the recording media, coated paper used for general offset printing is preferable. The coated paper is produced generally by coating a surface of a general printing paper containing cellulose as the major component (such as high-quality paper or neutral paper), which has not been subjected to surface treatment, with a coating material so as to form a coating layer. When image forming is performed by a common water-based ink jet, the coated paper is apt to produce problems in quality, for example, in glossiness of an image and scratch resistance of image; however, in the ink jet recording method according to the present invention, unevenness of glossiness is suppressed, and an image having excellent glossiness and scratch resistance can be obtained. In particular, it is preferable to use a coated paper having a base paper and a coated layer including kaolin and/or calcium bicarbonate. Further specifically, it is more preferable to use art paper, coat paper, lightweight coat paper, or very light-weight coat paper.

EXAMPLES

Hereinafter, the present invention is described below in more detail with reference to examples, but the present invention is not limited to the following examples as long as it does not depart from the original gist thereof. Meanwhile, unless otherwise described, "parts" and "%" are mass-based.

The weight-average molecular weight was measured by gel permeation chromatography (GPC). The GPC was conducted using a HLC-8220 GPC (manufactured by Tosoh Corporation), in which three columns of TSKgeL Super HZM-H, TSKgeL SuperHZ4000, and TSKgeL Super HZ2000 (trade names, all manufactured by Tosoh Corporation) were connected in series, and THF (tetrahydrofuran) was used as an eluent. The GPC conditions were a sample concentration of 0.35% by mass, a flow rate of 0.35 ml/min, a sample injection amount of 10 and a measurement temperature of 40° C., and a RI detector was used. A standard curve was made from eight samples of "standard sample TSK standard, polystyrene": "F-40", "F-20", "F-4", "F-1", "A-5000", "A-2500", "A-1000", and "n-propyl benzene" (manufactured by Tosoh Corporation).

The average particle diameter of colloidal silica was measured in the following manner. A colloidal silica liquid sample was added dropwise and dried on a nickel-made mesh grid so as to manufacture a sample for observation, and the diameter of corresponding circles were measured using a TEM (transmission electron microscope (JEM1010 (manufactured by JEOL Ltd., an accelerating voltage of 80 kV))). 300 particles were measured, and an average particle diameter was obtained from the average value of 300 particles.

Preparation of Ink Composition

Synthesis of Water-Insoluble Polymer Dispersant P-1

88 g of methyl ethyl ketone was added into a 1000 ml three-neck flask having a stirrer and a cooling tube and heated up to 72° C. in a nitrogen atmosphere, and then a solution of 0.85 g of dimethyl-2,2'-azobisisobutylate, 50 g of phenoxy ethyl methacrylate, 13 g of methacrylic acid, and 37 g of methyl methacrylate dissolved in 50 g of methyl ethyl ketone was added dropwise over 3 hours. After completion of the dropwise addition, the resulting substance was left to react for additional 1 hour, and a solution of 0.42 g of dimethyl-2,2'-azobisisobutylate dissolved in 2 g of methyl ethyl ketone was added, and then the resulting substance was heated up to 78° C. and heated for 4 hours. The obtained reaction solution was reprecipitated twice in an excess amount of hexane, and the precipitated resin was dried, whereby 96.5 g of copolymer (resin dispersant P-1) of phenoxy ethyl methacrylate/methyl methacrylate/methacrylic acid (with a copolymerization ratio (% by mass-ratio) of 50/37/13) was obtained.

The composition of the obtained resin dispersant P-1 was determined with a $^1$H-NMR, and the weight-average molecular weight (Mw) obtained by a GPC was 49400. The acid value of this polymer was obtained by a method defined in JIS standard (JIS K 0070:1992, which is incorporated herein by reference), which was 84.8 mgKOH/g.

Preparation of Colorant Particle Dispersion C 10 parts of Pigment Blue 15:3 (phthalocyanine blue A220 manufactured by Dainichiseika Color & Chemicals Mfg. Co., Ltd.; cyan pigment), 4 parts of the polymer dispersant P-1, 42 parts of methyl ethyl ketone, 4.4 parts of 1 mol/L NaOH aqueous solution and 87.2 parts of ion-exchange water were mixed and dispersed by a bead mill using 0.1 mmφ zirconia beads for 2 to 6 hours.

After the methyl ethyl ketone was removed from the obtained dispersion under reduced pressure at 55° C., and a part of water was further removed, the dispersion was subjected to a centrifugal treatment at 8000 rpm for 30 minutes by a high speed refrigerated centrifuge 7550 (manufactured by Kubota Corporation) using a 50 mL centrifuge tube, and the supernatant liquid other than the precipitate was collected.

Thereafter, the pigment concentration was obtained from the absorbance spectrum, and a colorant particle dispersion C was obtained as a dispersion of resin-coated pigment particle (encapsulated pigment) having a pigment concentration of 10.2% by mass.

Synthesis of Self-Dispersing Polymer Particles (Exemplary Compound B-01)

360.0 g of methyl ethyl ketone was fed into a 2 liter three-neck flask having a stirrer, a thermometer, a reflux cooling tube, and a nitrogen gas injection tube and heated up to 75° C. Then, while maintaining the temperature inside the flask at 75° C., a mixed solution of 180 g composed of phenoxy ethyl acrylate, 162.0 g of methyl methacrylate, 18.0 g of acrylic acid, 72 g of methyl ethyl ketone, and 1.44 g of "V-601" (manufactured by Wako Pure Chemical Industries Ltd.) was added dropwise at such a constant speed that the dropwise addition would finish in 2 hours. After completion of the dropwise addition, a solution composed of 0.72 g of "V-601" and 36.0 g of methyl ethyl ketone was added thereto, and, after the resulting substance was stirred for 2 hours at 75° C., a solution composed of 0.72 g of "V-601" and 36.0 g of isopropanol was further added. Then, the resulting substance was stirred for 2 hours at 75° C., and then heated up to 85° C. and, furthermore, stirred for 2 hours, whereby a resin solution of a copolymer of phenoxy ethylacrylate/methyl methacrylate/acrylic acid (=50/45/5 (mass ratio)) was obtained.

The weight-average molecular weight (Mw) and acid value of the obtained copolymer each were measured in the same manner as described above. The weight-average molecular weight (Mw) was found to be 64,000 (calculated in terms of polystyrene by gel permeation chromatography (GPC)) and the acid value was found to be 38.9 mgKOH/g.

Next, 668.3 g of the obtained resin solution was weighed, and 388.3 g of isopropanol and 145.7 ml of a 1 mol/L NaOH aqueous solution were added thereto, and the temperature inside the reaction container was heated up to 80° C. Subsequently, 720.1 g of distilled water was added dropwise at a speed of 20 ml/min., and, after performing an aqueous dispersion, the resulting substance was maintained under atmospheric pressure at an inside temperature of the reaction container of 80° C. for 2 hours, 85° C. for 2 hours, and 90° C. for hours, then the pressure inside the reaction container was reduced, and total amount of 913.7 g of isopropanol, methyl ethyl ketone, and distilled water was removed by distillation, whereby an aqueous dispersion of a self-dispersing polymer particles (exemplary compound B-01) having a solid content concentration of 28.0% by mass was obtained.

Synthesis of Polymerizable Compound 1

40.0 g (182 mmol) of 4,7,10-trioxa-1,13-tridecandiamine, 37.8 g (450 mmol) of sodium hydrogen carbonate, 100 g of water and 300 g of tetrahydrofuran were added to a 1 liter three-neck flask having a stirrer, and 35.2 g (389 mmol) of acrylic acid chloride was added dropwise over 20 minutes in an ice bath. After the dropwise addition, the resulting substance was stirred for 5 hours at room temperature, and the tetrahydrofuran was removed from the obtained reaction mixture by distillation under reduced pressure. Next, an aqueous layer was extracted four times with 200 ml of ethyl acetate, and the obtained organic layer was dried with magnesium sulfate and then filtered, and the solvent was removed by distillation under reduced pressure, whereby 35.0 g (107 mmol, yield of 59%) of a solid of targeted polymerizable compound 1 was obtained.

Preparation of Ink Composition for Ink Jet

Ink Composition C-2

The colorant particle dispersion C, self-dispersing polymer particles (exemplary compound B-01), polymerizable compound 1, which were obtained in the above, and colloidal silica (SNOWTEX XS, trade name, average particle diameter of 5 nm, manufactured by Nissan Chemical Industries Ltd.) were mixed to provide the following ink composition. The mixture was loaded into a plastic-made disposable syringe and filtered using a PVDF 5 µm filter (MILLEX-SV, diameter of 25 mm, manufactured by Millipore Corporation), whereby cyan ink (ink composition for ink jet) C-2 was prepared.

| Ink composition | |
|---|---|
| Colorant particle dispersion C | 29.4% |
| Aqueous dispersion of the self-dispersing polymer fine particles (B-01)(solid content) | 1.5% |
| Polymerizable compound 1 (represented by the following structure) | 15% |
| Diethylene glycol monoethyl ether (DEGmEE) (manufactured by Wako Pure Chemical Industries Ltd.) | 1% |
| Colloidal silica (solid content) (SNOWTEX XS, solid content concentration of 20%, manufactured by Nissan Chemical Industries Ltd.) | 1.5% |
| OLFINE E1010 (trade name, manufactured by Nissin Chemical Industry Co., Ltd.) | 1% |
| IRGACURE 2959 (trade name, manufactured by Ciba Japan K.K.) | 3% |
| Ion-exchange water | remaining amount (added such that the total amount was 100%) |

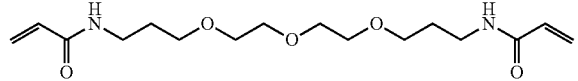

Polymerizable compound 1

Ink Compositions C-1 and C-3 to C-10

Cyan inks C-1 and C-3 to C-10 each were prepared in the same manner as in the preparation of the cyan ink C-2 except that each of the Polymerizable compounds in Table 1 below was used instead of the polymerizable compound 1 and the kinds and the amount added of colloidal silica were changed to the kinds and the amount shown in Table 1, respectively.

TABLE 1

| | Polymerizable compound | | Colloidal silica | | Mass ratio Silica/ | |
| | (Monomer) | | | Particle | Amount | monomer | |
| Ink name | Kind | Amount added (% by mass) | Kind | diameter (nm) | added (% by mass) | (% by mass/ % by mass) | Remarks |
| C-1 | Compound 5 | 3 | SNOWTEX C | 15 | 0.5 | 0.167 | Comparative example |

TABLE 1-continued

| Ink name | Polymerizable compound (Monomer) Kind | Amount added (% by mass) | Colloidal silica Kind | Particle diameter (nm) | Amount added (% by mass) | Mass ratio Silica/ monomer (% by mass/ % by mass) | Remarks |
|---|---|---|---|---|---|---|---|
| C-2 | Compound 1 | 15 | SNOWTEX XS | 5 | 1.5 | 0.1 | Present invention |
| C-3 | Compound 1 | 15 | SNOWTEX XS | 5 | 0.5 | 0.03 | Present invention |
| C-4 | Compound 1 | 15 | SNOWTEX XS | 5 | 0.05 | 0.003 | Present invention |
| C-5 | Compound 1 | 15 | SNOWTEX XS | 5 | 0.005 | 0.0003 | Present invention |
| C-6 | Compound 1 | 15 | SNOWTEX C | 15 | 0.05 | 0.003 | Present invention |
| C-7 | Compound 1 | 15 | SNOWTEX CM | 25 | 0.05 | 0.003 | Present invention |
| C-8 | Compound 2 | 15 | SNOWTEX XS | 5 | 0.05 | 0.003 | Present invention |
| C-9 | Compound 3 | 15 | SNOWTEX XS | 5 | 0.05 | 0.003 | Present invention |
| C-10 | Compound 4 | 15 | SNOWTEX XS | 5 | 0.05 | 0.003 | Present invention |

The structures of the Polymerizable compounds and the details of colloidal silica described in Table 1 are as follows:

Polymerizable compound 2

$$H_2C-O-(CH_2CH_2-O)_3-CH_2-NHCO-CH=CH_2$$
$$HC-O-(CH_2CH_2-O)_3-CH_2-NHCO-CH=CH_2$$
$$H_2C-O-(CH_2CH_2-O)_3-CH_2-NHCO-CH=CH_2$$

Polymerizable compound 3

$$C-\{H_2C-O-(CH_2CH_2-O)_3-CH_2-NHCO-CH=CH_2\}_4$$

Polymerizable compound 4

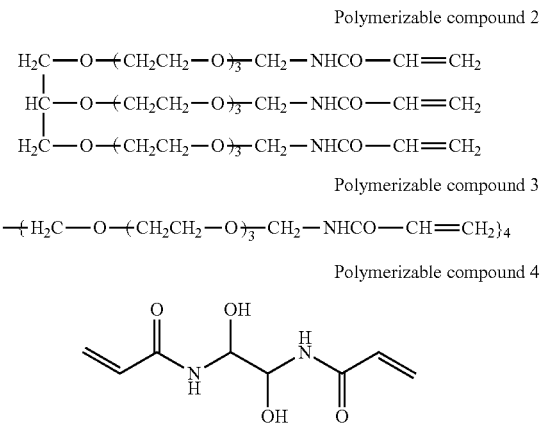

Manufactured by Tokyo Chemical Industry Co., Ltd.

Polymerizable Compound 5 (Comparative Compound)

Polyethylene glycol diacrylate (A-400; trade name, manufactured by Shin-Nakamura Chemical Co., Ltd.)

Polymerizable compounds 2 and 3 can be synthesized according to Polymerizable compound 1 above.

Colloidal Silica

SNOWTEX C: solid content concentration 20%, manufactured by Nissin Chemical Industry Ltd.

SNOWTEX CM: solid content concentration 30%, manufactured by Nissin Chemical Industry Ltd.

Preparation of Treatment Liquid

A treatment liquid was prepared in the following manner.

Preparation of Treatment Liquid 1

Treatment liquid 1 was prepared by mixing the components of the following composition. The viscosity of treatment liquid 1 was 2.5 mPa·s, the surface tension of treatment liquid 1 was 40 mN/m, and pH (25° C.) of treatment liquid 1 was 1.0. The surface tension was measured using an automatic surface tensiometer CBVP-Z (trade name, manufactured by Kyowa Interface Science Co., Ltd.), and the viscosity was measured using DV-III ULTRA CP (trade name, manufactured by Brookfield Engineering). The pH was measured using a PH meter HM-30R (trade name, manufactured by DKK boa Corporation).

| Composition of treatment liquid 1 | |
|---|---|
| Malonic acid (manufactured by Wako Pure Chemical Industries Ltd.) | 25% by mass |
| Diethylene glycol monomethyl ether (manufactured by Wako Pure Chemical Industries Ltd.) | 20.0% by mass |
| EMULGEN P109 (trade name, manufactured by Kao Corporation, nonionic surfactant) | 1.0% by mass |
| Ion-exchange water | 54% by mass |

Image Formation and Evaluation

By using the above-obtained ink compositions and treatment liquid, an image was formed and evaluated (a liquid-repellent property, a recovery property after non-use and scratch resistance) in the following manner. The evaluation results are shown in Table 2 below.

An ink jet head having a silicon nozzle plate shown in FIG. 1 was prepared, and a storage tank connected to the ink jet head was refilled with the above-obtained ink composition. A liquid-repellent film had been provided in advance on the silicon nozzle plate using a fluorinated alkylsilane compound. As a recording medium, "TOPKOTE PLUS" (with a basis weight of 104.7 g/m², trade name, manufactured by Oji Paper Co., Ltd.) was mounted on a stage capable of moving in a predetermined linear direction at 500 mm/second, and the temperature of the stage was maintained at 30° C. The above-obtained treatment liquid 1 was coated on the recording medium using a bar coater so as to have a thickness of about 1.2 µm, and dried for 2 seconds at 50° C. immediately after coating.

Then, the ink jet head was fixed and arranged such that the ink ejecting direction in which the line head was provided was obliquely arrayed at an angle of 75.7° (main scanning direction) with respect to a direction orthogonal to the moving direction of the stage (subscanning direction), and the ink was ejected by a line method under the ejection conditions of an ink droplet amount of 2.8 µL, an ejection frequency of 25.5 kHz, and a resolution of 1200 dpi×1200 dpi, while moving the recording medium in the subscanning direction at a constant speed, whereby the ink was ejected on the entire surface of a sample, which was the recording medium cut into A5 size, to produce a solid image. After recording the image, the image was dried by blowing, on the recorded surface, 120° C. warm air with an air blower at 5 m/sec. for 15 seconds, while heating, with an infrared heater, a back side (rear surface) of a surface on which the ink was ejected. After drying the image, the image was cured by irradiating UV light (a metal halide lamp, manufactured by Eye Graphics Co., Ltd., maximum irradiation wavelength: 365 nm) such that the cumulative irradiance level was 3 J/cm².

Scratch Resistance Evaluation

The A5-sized sample carrying the solid image on the entire one surface thereof was left to stand in an environment of 25° C. and 50% RH for 72 hours. Then TOPKOTE PLUS that has not undergone recording (hereinafter, referred to as 'unused sample' in the evaluation) was placed over the surface of the A5-sized sample after the standing, and rubbed thereagainst 10 strokes with a load of 200 kg/m2. Thereafter, the unused sample and the solid image were observed with the naked eye, and evaluated based on the evaluation criteria below.

Evaluation Criteria

A: The color did not transfer onto the unused sample, and deterioration in the rubbed solid image was not observed.
B: Although the color transferred to the unused sample, deterioration in the rubbed solid image was not observed.
C: The color transferred to the unused sample, and most of the rubbed solid image was deteriorated.

Liquid-Repellent Property Evaluation
Liquid-Repellent Film Immersion Test

For the evaluation, a test specimen having a SAM film (liquid-repellent film) formed, on a 2 cm×2 cm silicon plate, using a fluorinated alkylsilane compound was manufactured. By using the manufactured test specimen, a contact angle of water on the liquid-repellent film was measured in the following manner, and the influence of the ink composition on the liquid-repellent film with respect to the liquid-repellent property was evaluated.

30 ml of each of the above prepared cyan inks C-1 to C-10 was weighed and put in a polypropylene-made 50 ml wide-opening bottle (1-BOY, trade name, wide-opening bottle 50 ml, manufactured by As One Corporation). Next, the above specimen was immersed in each of the cyan inks C-1 to C-10 and heated at 60° C. for 72 hours. Each of the specimens was taken out and washed with ultrapure water, and the contact angle of water on the liquid-repellent film surface was measured. Ultrapure water was used for the measurement of the contact angle of water. The contact angle was measured in an environment of 25° C. and 50 RH % according to a general method using a contact angle measuring machine (DM-500, trade name, manufactured by Kyowa Interface Science Co., Ltd.), and evaluated based on the evaluation criteria below.

A larger contact angle indicates a better liquid-repellent property. The contact angle of water before the immersion of the ink composition was 106.5 degrees.

Evaluation Criteria

AA: 80 degrees or higher.
A: from 60 degrees to less than 80 degrees.
B: from 40 degrees to less than 60 degrees.
C: less than 40 degrees.

Recovery Property after Non-Use
(Ejection Stability in an Ink Jet Recording Apparatus when Ejection of an Ink Composition was Stopped, an Ink Jet Recording Apparatus was Left to Stand for a Certain Period of Time, and then Ejection was Resumed)

As a recording medium, KASSAI SHASHINSHIAGE Pro (trade name, manufactured by FUJIFILM Corporation) was used, and a printed sample (line image) was formed by moving the stage holding the recording medium at a speed of 248 mm/minute and ejecting 2000 ink droplets from each nozzle in parallel with the transportation direction so as to form 96 lines at an ink droplet amount of 3.4 µL, an ejection frequency of 10 kHz, and nozzle array direction×transportation direction: 75×1200 dpi. Details of other conditions of formation of image were substantially the same as the above-mentioned solid image-forming conditions.

Subsequently, the obtained printed sample was observed with the naked eye, and it was confirmed whether the ink had been ejected from all the nozzles.

After forming the line images, the head was left to stand for a certain period of time as it was, and, subsequently, another recording medium was placed, and the ink was ejected again in the same conditions as described above, whereby a printed sample (line image) was manufactured. The obtained printed sample (line images) was observed with naked eye, and the recovery property after non-use was evaluated by the maximum time of being left to stand at which all 96 nozzles could eject the ink when 2000 ink droplets were ejected after the nozzles were left to stand for a certain period of time. The longer the time of being left to stand at which no faulty ink ejection occurred, the better the ejectability. The recovery property after non-use was evaluated based on the evaluation criteria below.

Evaluation Criteria

A: The time of being left to stand was 45 minutes or more.
B: The time of being left to stand was from 30 minutes to less than 45 minutes.
C: The time of being left to stand was from 20 minutes to less than 30 minutes.
D: The time of being left to stand was less than 20 minutes.
D is a practically problematic level.

TABLE 2

| Ink name | Liquid-repellent property | recovery property after non-use | Scratch resistance | Remarks |
| --- | --- | --- | --- | --- |
| C-1 | C | D | C | Comparative example |
| C-2 | A | C | A | Present invention |
| C-3 | AA | B | A | Present invention |
| C-4 | AA | A | A | Present invention |
| C-5 | A | A | A | Present invention |
| C-6 | B | A | A | Present invention |
| C-7 | B | A | B | Present invention |
| C-8 | A | A | A | Present invention |
| C-9 | A | A | A | Present invention |
| C-10 | AA | A | B | Present invention |

As shown in Table 2, in the examples of the present invention, the scratch resistance of the images was good, and an excellent effect was obtained in terms of ejection stability (the recovery property after non-use) when ejection of the ink composition was stopped and the apparatus was left to stand for a certain period of time, whereafter ejection was resumed. The deterioration of the liquid-repellent property of the ink jet head member was suppressed. In contrast, in the comparative example, in particular, the recovery property after non-use was not sufficient, and the scratch resistance and the liquid-repellent property were also effectively insufficient.

According to the present invention, it is provided an ink composition, an ink set and an image forming method using the same in which an excellent effect in terms of ejection stability (the recovery property after non-use) when ejection of the ink composition, in an ink jet recording apparatus, is stopped and the apparatus is left to stand for a certain period of time, whereafter ejection is resumed is obtained. Further, it is provided an ink composition, an ink set and an image forming method using the same in which the deterioration of the liquid-repellent property of an ink jet head member is suppressed and the scratch resistance of an image is excellent Embodiments of the present invention include, but are not limited to, the following.

<1> An ink composition comprising a colorant particle, a water-soluble polymerizable compound having an acrylamide structure in a molecule thereof, colloidal silica, and water.

<2> The ink composition according to <1>, wherein the water-soluble polymerizable compound is represented by the following Formula (1):

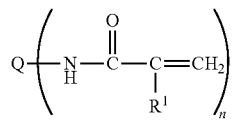

Formula (1)

wherein, in Formula (1), Q represents an n-valent linking group; R¹ represents a hydrogen atom or a methyl group; and n represents an integer of 1 or more.

<3> The ink composition according to <1> or <2>, further comprising an initiator that initiates polymerization of the water-soluble polymerizable compound when irradiated with active energy rays.

<4> The ink composition according to any one of <1> to <3>, wherein the colloidal silica has an average particle diameter of 25 nm or less.

<5> The ink composition according to any one of <1> to <4>, wherein the content of the colloidal silica is from 0.005% by mass to 0.5% by mass with respect to the total content of the ink composition.

<6> The ink composition according to any one of <1> to <5>, wherein the content ratio of the colloidal silica to the water-soluble polymerizable compound (colloidal silica/water-soluble polymerizable compound) is from 0.0001 to 0.1 on the basis of mass.

<7> The ink composition according to any one of <1> to <6>, wherein the colorant particle comprises a water dispersible pigment, and at least a part of a surface of the water dispersible pigment is coated with a polymer dispersant.

<8> The ink composition according to <7>, wherein the polymer dispersant contains a carboxyl group.

<9> The ink composition according to <7> of <8>, wherein the polymer dispersant has an acid value of 100 mgKOH/g or less.

<10> An ink set comprising: the ink composition according to any one of <1> to <9>; and a treatment liquid containing an aggregating agent that is capable of aggregating a component in the ink composition.

<11> The ink set according to <10>, wherein the aggregating agent comprises an organic acid.

<12> An image forming method comprising ejecting the ink composition according to any one of <1> to <9> onto a recording medium from an ink jet head including a silicon nozzle plate to form an image.

<13> The image forming method according to <12>, further comprising applying to the recording medium a treatment liquid that is capable of forming an aggregate when the treatment liquid is brought into contact with the ink composition.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink composition comprising a colorant particle, a water-soluble polymerizable compound having an acrylamide structure in a molecule thereof, colloidal silica, and water; wherein
the water-soluble polymerizable compound is represented by the following Formula (I):

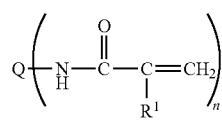

Formula (1)

wherein, in Formula (I), Q represents an n-valent linking group; R¹ represents a hydrogen atom or a methyl group; and n represents an integer of 1 or more and wherein
a content ratio of the colloidal silica to the water-soluble polymerizable compound (colloidal silica/water-soluble polymerizable compound) is 0.03 or less, on the basis of mass.

2. The ink composition according to claim 1, further comprising an initiator that initiates polymerization of the water-soluble polymerizable compound when irradiated with active energy rays.

3. The ink composition according to claim 1, wherein the colloidal silica has an average particle diameter of 25 nm or less.

4. The ink composition according to claim 1, wherein the content of the colloidal silica is from 0.005% by mass to 0.5% by mass with respect to the total content of the ink composition.

5. The ink composition according to claim 1, wherein the colorant particle comprises a water dispersible pigment, and at least a part of a surface of the water dispersible pigment is coated with a polymer dispersant.

6. The ink composition according to claim 5, wherein the polymer dispersant contains a carboxyl group.

7. The ink composition according to claim 5, wherein the polymer dispersant has an acid value of 100 mgKOH/g or less.

8. An ink set comprising: the ink composition according to claim 1; and a treatment liquid containing an aggregating agent that is capable of aggregating a component in the ink composition.

9. The ink set according to claim 8, wherein the aggregating agent comprises an organic acid.

10. An image forming method comprising ejecting the ink composition according to claim 1 onto a recording medium from an ink jet head including a silicon nozzle plate to form an image.

11. The image forming method according to claim 10, further comprising applying to the recording medium a treatment liquid that is capable of forming an aggregate when the treatment liquid is brought into contact with the ink composition.

12. The ink composition of claim 1, wherein the content ratio of the colloidal silica to the water-soluble polymerizable compound (colloidal silica/water-soluble polymerizable compound) is from 0.0001 to 0.03 on the basis of mass.

* * * * *